(12) United States Patent
Morishita et al.

(10) Patent No.: US 8,421,975 B2
(45) Date of Patent: Apr. 16, 2013

(54) LIQUID CRYSTAL DISPLAY DEVICE

(75) Inventors: Katsuhiko Morishita, Osaka (JP);
Toshihiro Matsumoto, Osaka (JP);
Tsuyoshi Okazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 189 days.

(21) Appl. No.: 13/123,924

(22) PCT Filed: Jun. 22, 2009

(86) PCT No.: PCT/JP2009/061309
§ 371 (c)(1),
(2), (4) Date: Apr. 13, 2011

(87) PCT Pub. No.: WO2010/044289
PCT Pub. Date: Apr. 22, 2010

(65) Prior Publication Data
US 2011/0199568 A1      Aug. 18, 2011

(30) Foreign Application Priority Data

Oct. 14, 2008   (JP) .................................. 2008-265562

(51) Int. Cl.
*G02F 1/1333*    (2006.01)
(52) U.S. Cl.
USPC .......................................... 349/141; 349/129
(58) Field of Classification Search .................. 349/129, 349/141
See application file for complete search history.

(56) References Cited

U.S. PATENT DOCUMENTS

| | | |
|---|---|---|
| 6,181,402 B1 | 1/2001 | Shim et al. |
| 6,222,599 B1 | 4/2001 | Yoshida et al. |
| 6,512,565 B1 | 1/2003 | Lee et al. |
| 6,642,984 B1 | 11/2003 | Yoshida et al. |

(Continued)

FOREIGN PATENT DOCUMENTS

| | | |
|---|---|---|
| GB | 2 326 012 A | 12/1998 |
| JP | 57-618 | 1/1982 |

(Continued)

OTHER PUBLICATIONS

International Search Report for PCT/JP2009/059899, mailed Aug. 18, 2009.

(Continued)

*Primary Examiner* — Phu Vu
(74) *Attorney, Agent, or Firm* — Nixon & Vanerhye, P.C.

(57) ABSTRACT

The present invention provides a liquid crystal display device which can suppress generation of an afterimage. The present invention is a liquid crystal display device, includes:

a first substrate and a second substrate which are disposed to face each other; and a liquid crystal layer sandwiched between the first substrate and the second substrate, wherein the first substrate has a comb type first electrode including a first branch portion and a comb type second electrode including a second branch portion, the first electrode and the second electrode are planarly disposed to face each other in a pixel, the liquid crystal layer includes p-type nematic liquid crystals and is driven by an electric field generated between the first electrode and the second electrode, the p-type nematic liquid crystals are aligned perpendicularly to the first substrate and second substrate surfaces when no voltage is applied, the first branch portion and the second branch portion extend diagonally with respect to a boundary line between adjacent pixels, and a distance between the first electrode and the second electrode is substantially uniform in an area surrounding an end of the first branch portion.

22 Claims, 29 Drawing Sheets

U.S. PATENT DOCUMENTS

| | | | |
|---|---|---|---|
| 6,704,083 B1 | 3/2004 | Kim et al. | |
| 6,891,196 B2 | 5/2005 | Tanaka et al. | |
| 7,064,801 B2 | 6/2006 | Kubo et al. | |
| 8,054,435 B2* | 11/2011 | Ishihara et al. | 349/141 |
| 2001/0010575 A1 | 8/2001 | Yoshida et al. | |
| 2002/0051109 A1 | 5/2002 | Nakanishi et al. | |
| 2003/0128323 A1 | 7/2003 | Matsumoto et al. | |
| 2003/0197824 A1 | 10/2003 | Shim et al. | |
| 2004/0066480 A1 | 4/2004 | Yoshida et al. | |
| 2004/0090564 A1 | 5/2004 | Lee | |
| 2004/0114084 A1 | 6/2004 | Kim et al. | |
| 2004/0141134 A1 | 7/2004 | Nakanishi et al. | |
| 2005/0128410 A1 | 6/2005 | Lee | |
| 2005/0151911 A1 | 7/2005 | Kim et al. | |
| 2006/0103801 A1 | 5/2006 | Nakanishi et al. | |
| 2006/0145990 A1* | 7/2006 | Kim et al. | 345/94 |
| 2007/0008476 A1 | 1/2007 | Nakanishi et al. | |
| 2008/0100764 A1 | 5/2008 | Haruyama | |
| 2008/0106541 A1 | 5/2008 | Yamazaki | |
| 2008/0211974 A1 | 9/2008 | Ikebe | |
| 2009/0201449 A1 | 8/2009 | Nishida | |
| 2010/0110358 A1 | 5/2010 | Um et al. | |

FOREIGN PATENT DOCUMENTS

| | | |
|---|---|---|
| JP | 8-43861 | 2/1996 |
| JP | 10-186351 | 7/1998 |
| JP | 10-333171 | 12/1998 |
| JP | 11-24068 | 1/1999 |
| JP | 11-326955 | 11/1999 |
| JP | 11-352483 | 12/1999 |
| JP | 2000-81641 | 3/2000 |
| JP | 2000-275682 | 10/2000 |
| JP | 2000-305100 | 11/2000 |
| JP | 2001-91974 | 4/2001 |
| JP | 2001-159759 | 6/2001 |
| JP | 2001-209063 | 8/2001 |
| JP | 2002-55357 | 2/2002 |
| JP | 2002-139735 | 5/2002 |
| JP | 2003-207803 | 7/2003 |
| JP | 2005-173617 A | 6/2005 |
| JP | 2007-4126 | 1/2007 |
| JP | 2008-116694 | 5/2008 |
| JP | 2008-242415 A | 10/2008 |
| JP | 2009-288436 | 12/2009 |
| JP | 2010-38977 | 2/2010 |
| RU | 2 335 004 C2 | 3/2008 |
| WO | WO 2008/001507 | 1/2008 |
| WO | WO 2009/139199 | 11/2009 |
| WO | WO 2009/157271 | 12/2009 |
| WO | WO 2010/044289 | 4/2010 |

OTHER PUBLICATIONS

Ohmuro, K. et al., "Development of Super-High-Image-Quality Vertical-Alignment-Mode LCD", SID 97 Digest, No. 33.3, (1997), pp. 845-848.

Yoshida, H. et al., "Multi-Domain Vertically Aligned LCDs with Super-Wide Viewing Range for Gray-Scale Images", No. 12.2, pp. 1-4, 2004.

Soref, R.A., "Field Effects in Nematic Liquid Crystals Obtained with Interdigital Electrodes", Journal of Applied Physics, vol. 45, No. 12, (Dec. 1974), pp. 5466-5468.

Kiefer, R. et al., "In-Plane Switching of Nematic Liquid Crystals", Japan Display, (1992), pp. 547-550.

Bos, P.L. et al., "An Optically "Self-Compensating" Electro-Optical Effect with Wide Angle of View", SID 93 Digest, (1993), pp. 273-276.

Yamaguchi, Y. et al., "Wide-Viewing-Angle Display Mode for the Active-Matrix LCD Using Bend-Alignment Liquid-Crystal Cell", SID 93 Digest, (1993), pp. 277-280.

International Search Report for PCT/JP2009/051628, mailed Mar. 10, 2009.

International Search Report for PCT/JP2009/060710, mailed Jul. 7, 2009.

International Search Report for PCT/JP2009/061309, mailed Oct. 6, 2009.

U.S. Appl. No. 13/122,796, Okazaki, T. et al., filed Apr. 6, 2011.

U.S. Appl. No. 12/993,151, Ishihara, S. et al., filed Nov. 17, 2010.

U.S. Appl. No. 12/992,324, Morishita, K. et al., filed Nov. 12, 2010.

* cited by examiner

Fig. 8
(a)
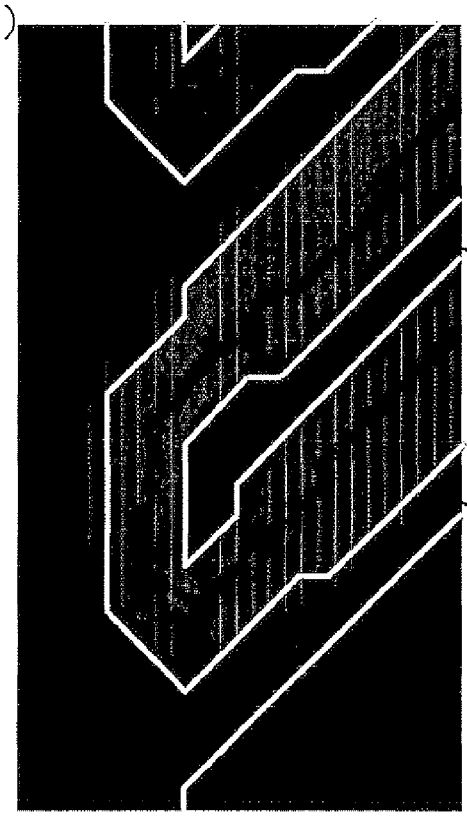
(b)
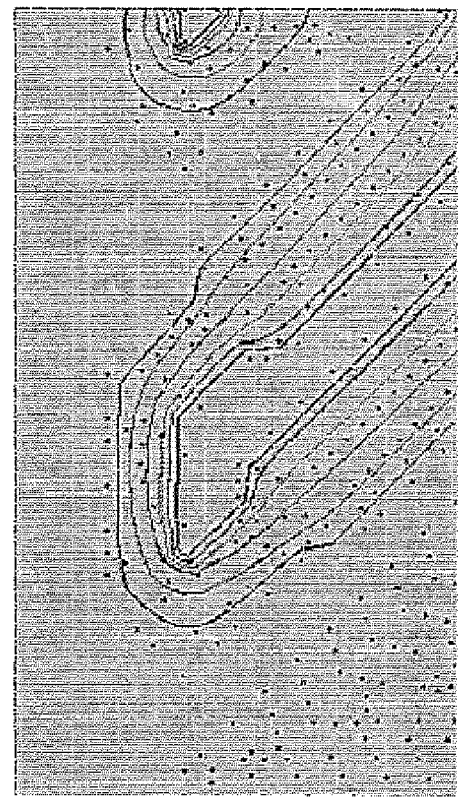
(c)
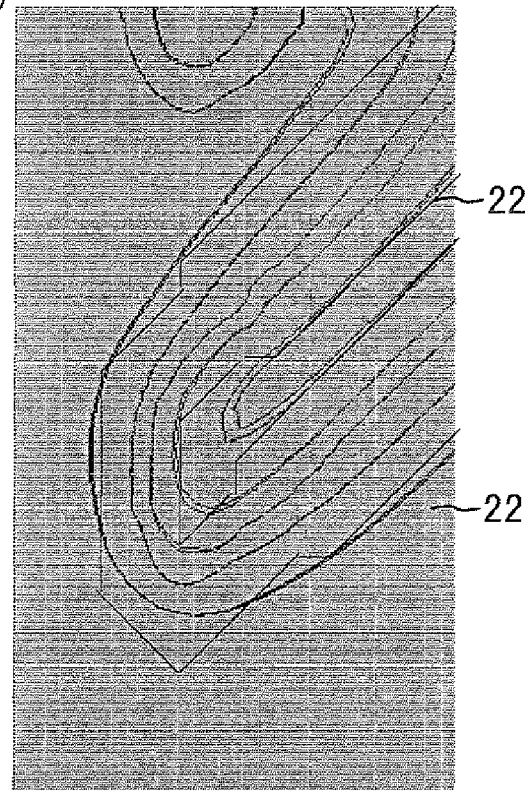

Fig. 9
(a) (b)
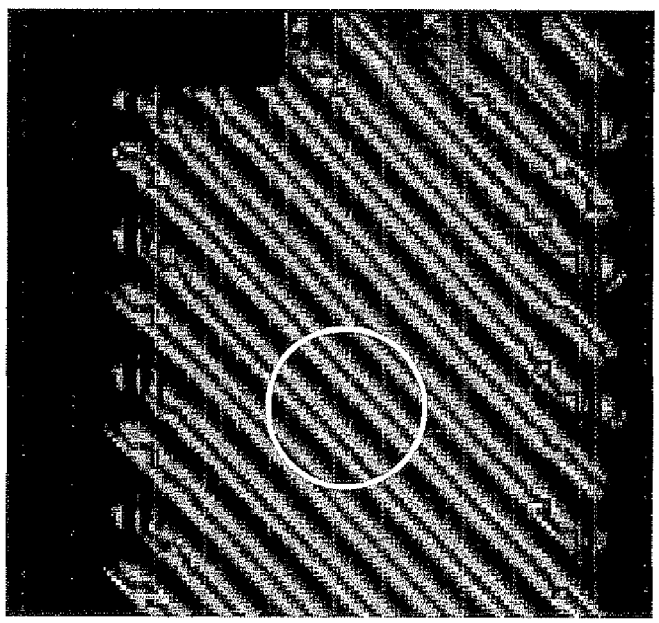
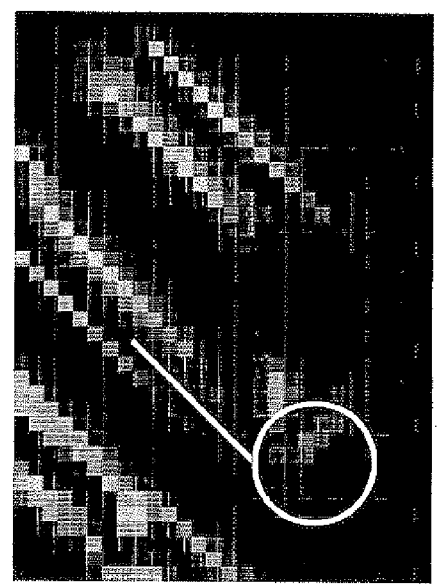

Fig. 19
(a)
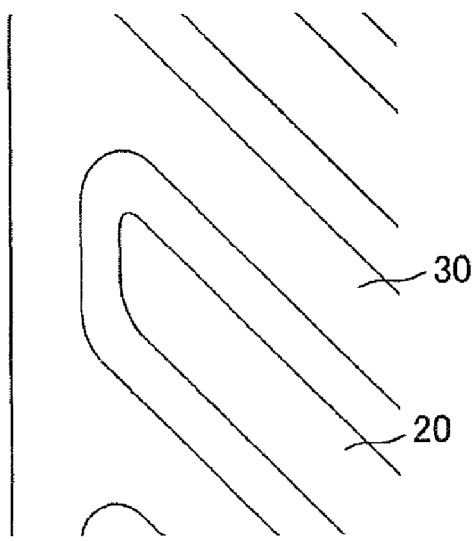
(b)
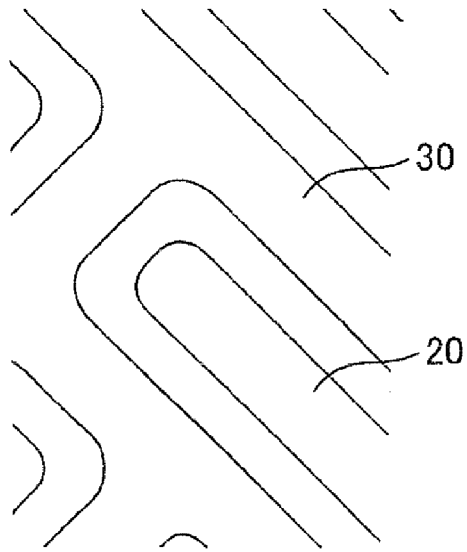
(c)
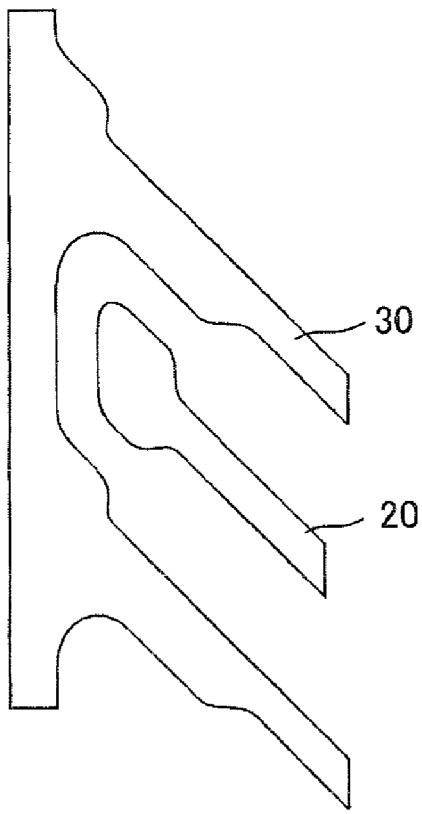
(d)
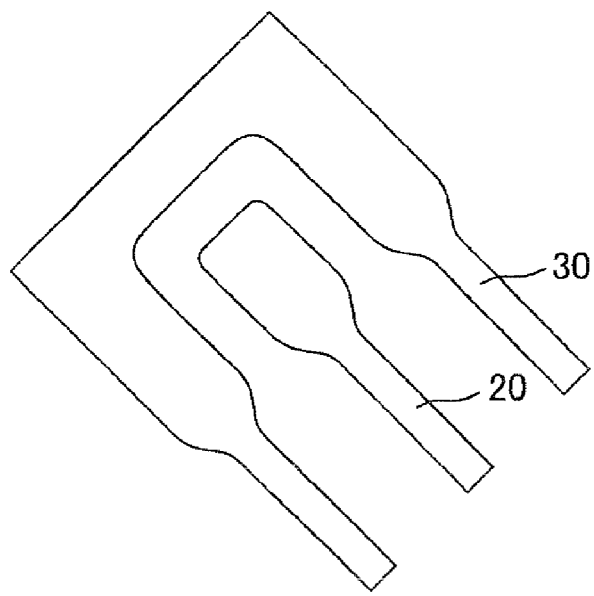

Fig. 22
(a) 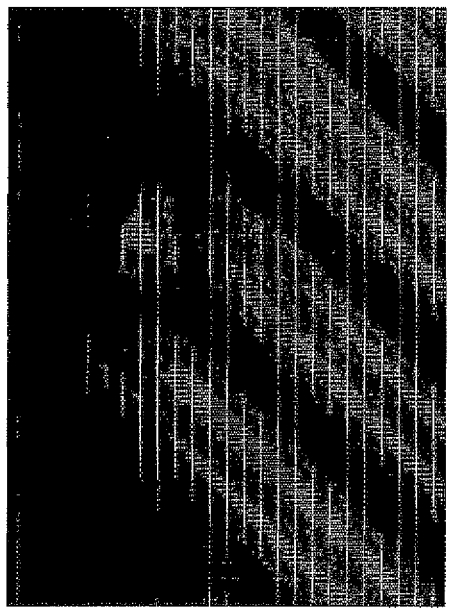
(b) 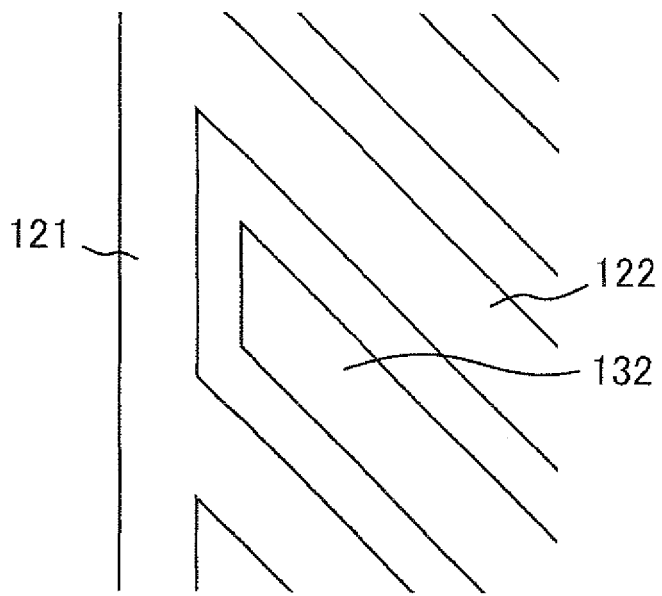

Fig. 26
(a) 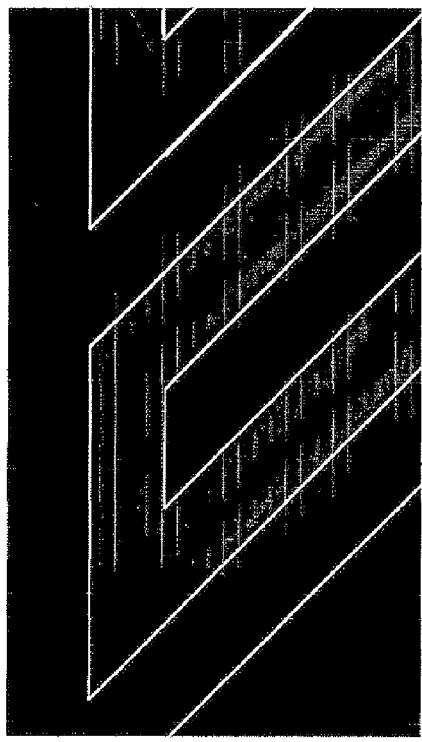
(b) 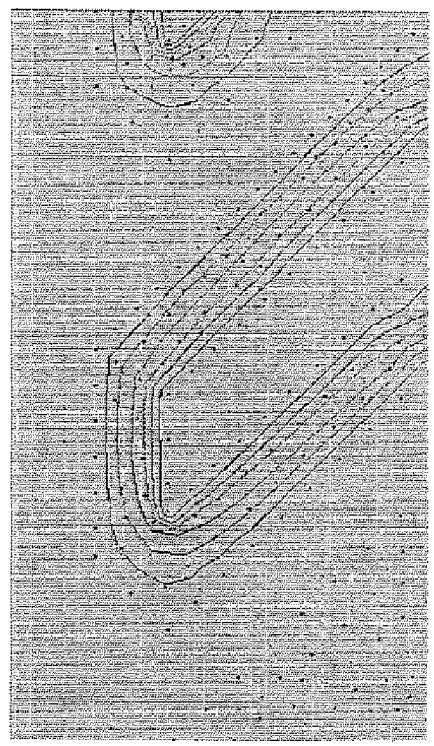
(c) 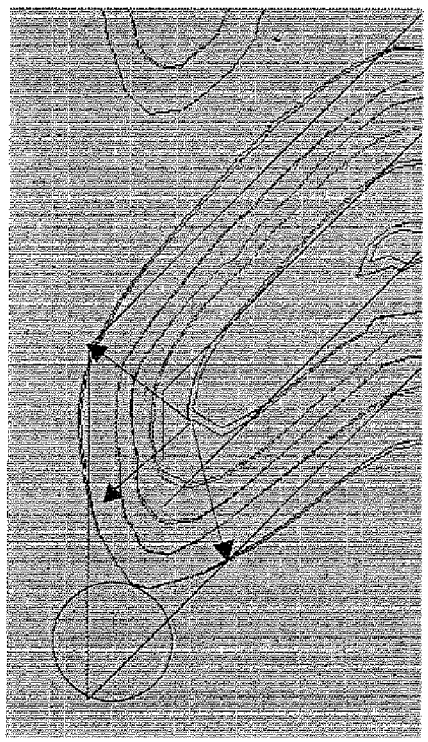

Fig. 27
(a) 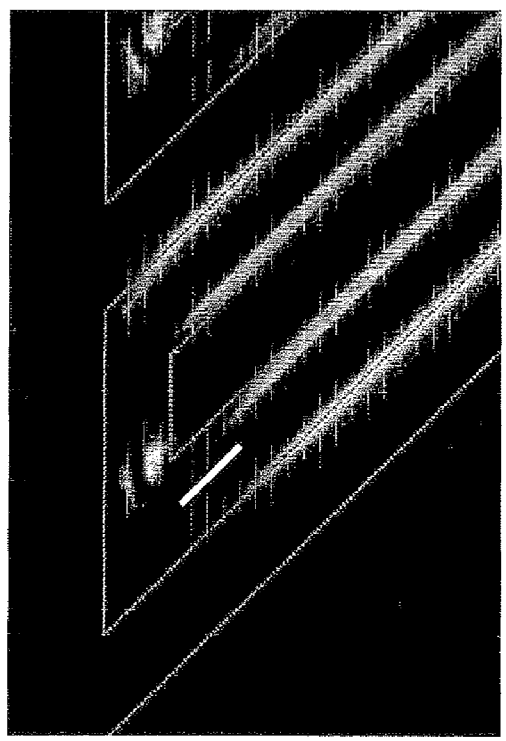 (b) 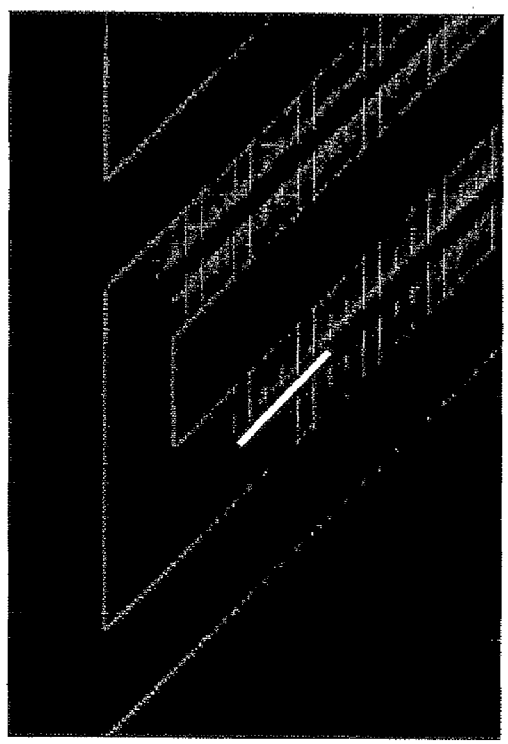
Fig. 28
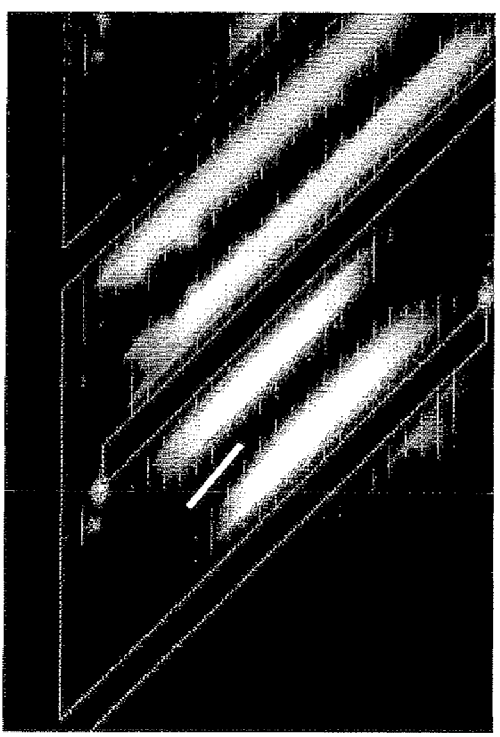

(a)    (b)

Fig. 31
(a) 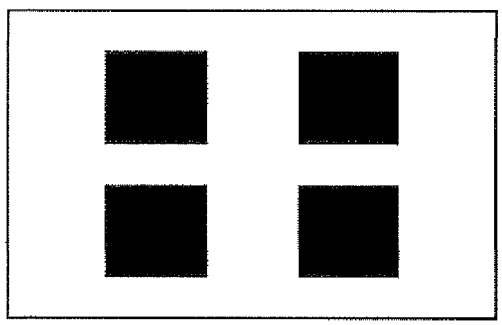 (b) 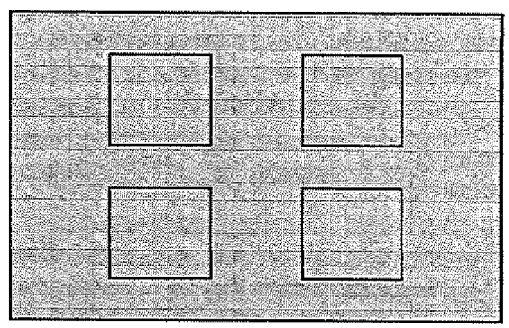
Fig. 32
(a) 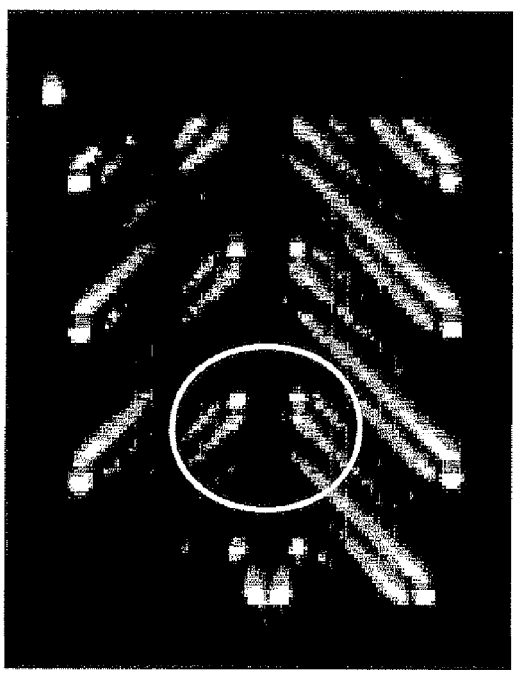 (b) 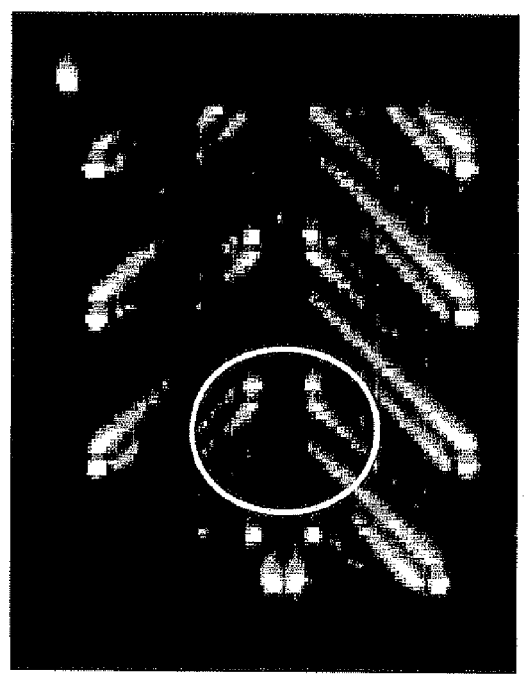

LIQUID CRYSTAL DISPLAY DEVICE

This application is the U.S. national phase of International Application No. PCT/JP2009/061309, filed 22 Jun. 2009, which designated the U.S. and claims priority to JP Application No. 2008-265562, filed 14 Oct. 2008, the entire contents of each of which are hereby incorporated by reference.

TECHNICAL FIELD

The present invention relates to a liquid crystal display device, and more particularly to a display device which can be suitably used for a liquid crystal display device in a Transverse Bend Alignment (TBA) mode.

BACKGROUND ART

Liquid crystal display devices are characterized by thin profile, light weight and low power consumption, and are widely used in various fields. The display performance thereof has advanced dramatically over the years, and now even surpass CRTs (Cathode Ray Tube).

A display method of a liquid crystal display device is determined depending on how liquid crystals are aligned in a cell. Conventionally known display methods of liquid crystal display devices are, for example, a TN (Twisted Nematic) mode, an MVA (Multi-domain Vertical Alignment) mode, an IPS (In-Plane Switching) mode and an OCB (Optically self-Compensated Birefringence) mode.

Liquid crystal display devices using such display methods have been mass produced. Particularly liquid crystal display devices in a TN mode are widely used by the general public. However liquid crystal display devices in a TN mode require improvement in terms of increasing the response speed and viewing angle.

In the case of an MVA mode, on the other hand, slits are formed in a pixel electrode of an active matrix substrate, and protrusions (ribs) for controlling the alignment of liquid crystal molecules are disposed in a common electrode of a counter substrate, so that fringe fields generated by these slits and ribs disperse the alignment direction of the liquid crystal molecules into a plurality of directions. An MVA mode implements a wide viewing angle by dividing the directions, where liquid crystal molecules tilt down when a voltage is applied, into a plurality of types (multi-domains). Since an MVA mode is a vertical alignment mode, higher contrast can be obtained compared with TN, IPS and OCB modes. However an MVA mode requires improvements in terms of simplifying manufacturing steps, and also in increasing the response speed, just like the case of a TN mode.

To solve the process problems of an MVA mode, a display method (referred to as a "transverse bend alignment" (TBA) mode in this description) for using p-type nematic liquid crystals as a liquid crystal material and driving the p-type nematic liquid crystals using a transverse field has been proposed. In this method, a transverse field is generated by using such an electrode as a comb type electrode, and the alignment direction of the liquid crystal molecules is specified by the transverse field. Since this method is a vertical alignment mode, a high contrast ratio can be implemented.

An example of a liquid crystal display device that has been disclosed includes: a first and second substrates which face each other; a liquid crystal material layer which is injected between the first and second substrates and perpendicularly aligned with respect to the first and second substrates; and at least two or more electrodes which are formed on one of the first and second substrates, and are parallel with each other (e.g. see Patent Document 1).

The TBA method, which does not require alignment control by protrusions, has a simple pixel configuration, and has excellent viewing angle characteristics.

[Patent Document 1] Japanese Kokai Publication H10-333171

DISCLOSURE OF THE INVENTION

In the case of a liquid crystal display device in a TBA mode, however, an afterimage is sometimes generated. FIG. 31 are diagrams depicting an afterimage evaluation screen of the liquid crystal display device in a TBA mode, where FIG. 31(a) shows the time when a monochrome window pattern is displayed, and FIG. 31(b) shows the time when a half-tone solid pattern (pattern in which the entire screen is displayed with half-tones) is displayed. FIG. 32 are optical microphotographs of a sub-pixel when the half-tone solid pattern is displayed, where FIG. 32(a) shows the sub-pixels of an area where a white pattern is displayed before the gradation display, and FIG. 32(b) shows the sub-pixels of an area where a black pattern is displayed before the gradation display. To evaluate the afterimage, the white pattern at maximum grayscale (255 grayscales) and the black pattern at minimum grayscale (0 grayscale) are displayed for 30 minutes, as FIG. 31(a) shows, then the entire screen is displayed with half-tones (96 grayscales), as FIG. 31(b) shows. As a result, a brightness difference is generated between the sub-pixels in the area where a white pattern is displayed, and the sub-pixels in the area where black patterns are displayed, as shown in FIG. 32, even after switching to half-tone, and particularly the quantity of light in the area near the ends of the comb type electrode (comb teeth) (see the area enclosed with the white line in FIG. 32) is different, and this brightness difference generates an afterimage. This afterimage exceeds 3 seconds, which is the tolerance, finally disappearing after about 5 seconds.

With the foregoing in view, it is an object of the present invention to provide a liquid crystal display device which can suppress the generation of an afterimage.

Considering various studies on liquid crystal display devices that can suppress the generation of an afterimage, the present inventors directed their attention to the alignment of liquid crystal molecules, and discovered that in conventional liquid crystal display devices in a TBA mode, an afterimage is generated, upon changing the grayscale, due to the disturbance of alignment of liquid crystal molecules or loss of symmetry of alignment of liquid crystal molecules in the end area of the comb type electrode (comb teeth). They also discovered that the disturbance of alignment of liquid crystal molecules or loss of symmetry of alignment of liquid crystal molecules in the end area of the comb type electrodes (comb teeth) upon changing the grayscale can be suppressed, and the above problem is solved with excellence by: a configuration where a first branch portion of a first electrode and a second branch portion of a second electrode extend diagonally with respect to the boundary line of adjacent pixels, and the distance between the first electrode and the second electrode is substantially uniform in the area surrounding the end of the first branch portion; a configuration where the width of the end and the width of the center portion of the first branch portion of the first electrode are different, the width of the second electrode in the area surrounding the end of the first branch portion is different from the width of the center portion of the second branch portion of the second electrode, and the distance between the first electrode and the second electrode changes toward the end of the first branch portion while axisymmetric contours the first electrode and the second electrode are maintained; a configuration where the first branch portion of the first electrode and the second branch portion of the second electrode extend diagonally with respect to the boundary line between adjacent pixels and a gap between the first electrode and the second electrode is chamfered in an area adjacent to the end of the first branch portion; or a configuration combining these configurations, and as a result the present invention is reached.

In other words, the present invention is a liquid crystal display device, comprising:

a first substrate and a second substrate which are disposed to face each other; and a liquid crystal layer sandwiched between the first substrate and the second substrate, wherein the first substrate has a comb type first electrode including a first branch portion and a comb type second electrode including a second branch portion, the first electrode and the second electrode are planarly disposed to face each other in a pixel, the liquid crystal layer includes p-type nematic liquid crystals and is driven by an electric field generated between the first electrode and the second electrode, the p-type nematic liquid crystals are aligned perpendicularly to the first substrate and second substrate surfaces when no voltage is applied, the first branch portion and the second branch portion extend diagonally with respect to a boundary line between adjacent pixels, and a distance between the first electrode and the second electrode is substantially uniform in an area surrounding an end of the first branch portion. (Hereinafter called a "first liquid crystal display device of the present invention".) Thereby the generation of an afterimage can be suppressed. Transmittance can also be increased.

"Perpendicular" needs not be exactly perpendicular if the liquid crystal display device can function in a TBA mode. In other words, the above mentioned term "perpendicular" includes the meaning of "substantially perpendicular".

The configuration of the first liquid crystal display device of the present invention is not limited to these components, and other composing elements may or may not be included as long as the above composing elements are required essentials.

Now preferred embodiments of the first liquid crystal display device of the present invention will be described in detail. Various configurations to be shown below may be combined if appropriate.

The distance between the first electrode and the second electrode may be substantially uniform in an area surrounding an end of the second branch portion. Thereby the generation of an afterimage can be suppressed even more.

The first electrode or the second electrode may have a zigzag-shaped trunk portion. Thereby yield can be increased.

A width of the end of the first branch portion and a width of a center portion of the first branch portion may be different, and a width of the second electrode in the area surrounding the end of the first branch portion may be different from a width of a center portion of the second branch portion. Thereby transmittance can be increased.

In this case, a width of an end of the second branch portion and the width of the center portion of the second branch portion may be different, and a width of the first electrode in an area surrounding the end of the second branch portion may be different from the width of the center portion of the first branch portion. Thereby transmittance can be further increased.

The distance between the first electrode and the second electrode may change toward the end of the first branch portion while axisymmetric contours of the first electrode and the second electrode are maintained. Thereby transmittance can be further increased while effectively suppressing the generation of an afterimage.

In this case, the distance between the first electrode and the second electrode may change toward an end of the second branch portion while axisymmetric contours of the first electrode and the second electrode are maintained. Thereby transmittance can be still further increased while effectively suppressing the generation of an afterimage.

At least one of the first electrode and the second electrode may have rounded corners in plan view. Thereby the generation of an afterimage can be further suppressed.

The first liquid crystal display device of the present invention may be a color liquid crystal display device, and the pixel may be a sub-pixel.

The present invention is also a liquid crystal display device, comprising:

a first substrate and a second substrate which are disposed to face each other; and a liquid crystal layer sandwiched between the first substrate and the second substrate, wherein the first substrate has a comb type first electrode including a first branch portion and a comb type second electrode including a second branch portion, the first electrode and the second electrode are planarly disposed to face each other in a pixel, the liquid crystal layer includes p-type nematic liquid crystals and is driven by an electric field generated between the first electrode and the second electrode, the p-type nematic liquid crystals are aligned perpendicularly to the first substrate and second substrate surfaces when no voltage is applied, a width of an end of the first branch portion and a width of a center portion of the first branch portion are different, a width of the second electrode in an area surrounding the end of the first branch portion is different from a width of a center portion of the second branch portion, and a distance between the first electrode and the second electrode changes toward the end of the first branch portion while axisymmetric contours of the first electrode and the second electrode are maintained. (Hereinafter called a "second liquid crystal display device of the present invention".) Thereby the generation of an afterimage can be suppressed. Transmittance can also be increased.

"Perpendicular" needs not be exactly perpendicular if the liquid crystal display device can function in a TBA mode. In other words, the above mentioned term "perpendicular" includes the meaning of "substantially perpendicular".

The configuration of the second liquid crystal display device of the present invention is not limited to these components, and other composing elements may or may not be included as long as the above composing elements are required essentials.

Now preferred embodiments of the second liquid crystal display device of the present invention will be described in detail. Various configurations to be shown below may be combined if appropriate.

A width of an end of the second branch portion and the width of the center portion of the second branch portion may be different, a width of the first electrode in an area surrounding the end of the second branch portion may be different from the width of the center portion of the first branch portion, and the distance between the first electrode and the second electrode may change toward the end of the second branch portion while axisymmetric contours of the first electrode and the second electrode are maintained. Thereby the generation of an afterimage can be further suppressed.

The first branch portion and the second branch portion may extend diagonally with respect to a boundary line between adjacent pixels, and the distance between the first electrode and the second electrode may be substantially uniform in the area surrounding the end of the first branch portion. Thereby the generation of an afterimage can be suppressed efficiently in a liquid crystal display device where the first branch portion and the second branch portion extend diagonally with respect to the boundary line between adjacent pixels.

In this case, the distance between the first electrode and the second electrode may be substantially uniform in an area surrounding an end of the second branch portion. Thereby the generation of an afterimage can be suppressed more efficiently in a liquid crystal display device where the first branch portion and the second branch portion extend diagonally with respect to the boundary line between adjacent pixels.

The first electrode or the second electrode may have a zigzag-shaped trunk portion. Thereby yield can be increased.

At least one of the first electrode and the second electrode may have rounded corners in plan view. Thereby the generation of an afterimage can be further suppressed.

The second liquid crystal display device of the present invention may be a color liquid crystal display device, and the pixel may be a sub-pixel.

The present invention is a liquid crystal display device, comprising:

a first substrate and a second substrate which are disposed to face each other; and a liquid crystal layer sandwiched between the first substrate and the second substrate, wherein the first substrate has a comb type first electrode including a first branch portion and a comb type second electrode including a second branch portion, the first electrode and the second electrode are planarly disposed to face each other in a pixel, the liquid crystal layer includes p-type nematic liquid crystals and is driven by an electric field generated between the first electrode and the second electrode, the p-type nematic liquid crystals are aligned perpendicularly to the first substrate and second substrate surfaces when no voltage is applied, the first branch portion and the second branch portion extend diagonally with respect to a boundary line between adjacent pixels, and the first electrode and the second electrode has a gap therebetween, the gap being chamfered in an area adjacent to an end of the first branch portion. (Hereinafter called a "third liquid crystal display device of the present invention".) Thereby the generation of an afterimage can be further suppressed. In addition, the transmittance can be increased.

"Perpendicular" needs not be exactly perpendicular if the liquid crystal display device can function in a TBA mode. In other words, the above mentioned term "perpendicular" includes the meaning of "substantially perpendicular".

The configuration of the third liquid crystal display device of the present invention is not limited to these components, and other composing elements may or may not be included as long as the above composing elements are required essentials.

Now preferred embodiments of the third liquid crystal display device of the present invention will be described in detail. Various configurations to be shown below may be combined if appropriate.

The gap between the first electrode and the second electrode may be chamfered in an area adjacent to an end of the second branch portion. Thereby the generation of an afterimage can be further suppressed.

The first electrode or the second electrode may have a zigzag-shaped trunk portion. Thereby yield can be increased.

A width of the end of the first branch portion and a width of a center portion of the first branch portion may be different, and a width of the second electrode in an area surrounding the end of the first branch portion may be different from a width of a center portion of the second branch portion. Thereby the transmittance can be further increased.

In this case, a width of an end of the second branch portion and the width of the center portion of the second branch portion may be different, and a width of the first electrode in an area surrounding the end of the second branch portion may be different from the width of the center portion of the first branch portion. Thereby the transmittance can be further increased.

A distance between the first electrode and the second electrode may change toward the end of the first branch portion while axisymmetric contours of the first electrode and the second electrode are maintained. Thereby the transmittance can be further increased while effectively suppressing the generation of an afterimage.

In this case, the distance between the first electrode and the second electrode may change toward an end of the second branch portion while axisymmetric contours of the first electrode and the second electrode are maintained. Thereby the transmittance can be still further increased while effectively suppressing the generation of an afterimage.

At least one of the first electrode and the second electrode may have rounded corners in plan view. Thereby the generation of an afterimage can be further suppressed.

The third liquid crystal display device of the present invention may be a color liquid crystal display device, and the pixel may be a sub-pixel.

EFFECT OF THE INVENTION

According to the liquid crystal display device of the present invention, the generation of an afterimage can be suppressed.

BRIEF DESCRIPTION OF THE DRAWINGS

FIG. 3(a) shows a result of optical simulation (alignment simulation), FIG. 3(b) shows equipotential lines on the electrode surface, FIG. 3(c) shows equipotential lines on the intermediate layer of the liquid crystal layer, and FIG. 3(d) shows a cross-section at the A1-B1 line in FIG. 3(b).

FIG. 4(a) is a plan view schematically depicting a configuration, and FIGS. 4(b) to 4(e) show optical microphotographs.

FIG. 8 show a simulation result of the liquid crystal display device of Embodiment 1 shown in FIG. 6, where FIG. 8(*a*) shows a result of optical simulation (alignment simulation), FIG. 8(*b*) shows equipotential lines on the electrode surface, and FIG. 8(*c*) shows equipotential lines on the intermediate layer of the liquid crystal layer.

FIG. 9(*a*) shows optical microphotographs of the liquid crystal display device of Embodiment 1 shown in FIG. 6, and FIG. 9(*b*) is an enlarged view near the end of the branch portion of the pixel electrode shown in FIG. 9(*a*).

FIGS. 19(*a*) to 19(*d*) are plan views schematically depicting variant forms of the liquid crystal display device of Embodiment 1.

FIG. 22 shows the liquid crystal display device of Comparative Embodiment 1, where FIG. 22(*a*) shows an optical microphotograph near the trunk portion of the pixel electrode, and FIG. 22(*b*) is a plan view schematically depicting an area near the trunk portion of the pixel electrode, and FIG. 22 shows a photograph when L/S is set to 4.0 μm/4.0 μm, and maximum grayscale (255 grayscales) is applied.

FIG. 26 shows the simulation result of the liquid crystal display device of Embodiment 2, where FIG. 26(*a*) shows the result of the optical simulation (alignment simulation), FIG. 26(*b*) shows equipotential lines on the electrode surface, and FIG. 26(*c*) shows equipotential lines on the intermediate layer of the liquid crystal layer.

FIG. 27 shows the result of optical simulation (alignment simulation) of the liquid crystal display device of Embodiment 2, where FIG. 27(*a*) shows the result when the potential of the pixel electrode is 6 V, and FIG. 27(*b*) shows the result when the potential of the pixel electrode is 3 V.

FIG. 28 shows the result of optical simulation (alignment simulation) of the liquid crystal display device of Embodiment 3, and shows the result when the potential of the pixel electrode is 6 V.

FIG. 31 shows a schematic view of the afterimage evaluation screen of the liquid crystal display device in a TBA mode, where FIG. 31(*a*) shows the case when a monochrome window pattern is displayed, and FIG. 31(*b*) shows the case when a half-tone solid pattern is displayed.

FIG. 32 shows optical microphotographs of a sub-pixel when the half-tone solid pattern is displayed, where FIG. 32(*a*) shows a sub-pixel of an area where a white pattern is displayed before the gradation display, and FIG. 32(*b*) shows a sub-pixel of an area where black patterns are displayed before the gradation display.

BEST MODE FOR CARRYING OUT THE INVENTION

Embodiments of the present invention will now be described in detail with reference to the drawings, but the present invention is not limited to only these embodiments.

In each embodiment described below, it is assumed that the 3 o'clock direction, 12 o'clock direction, 9 o'clock direction and 6 o'clock direction, when the liquid crystal display device (display surface) is viewed from the front, are the 0° direction (azimuth), 90° direction (azimuth), 180° direction (azimuth) and 270° direction (azimuth), respectively, and a direction passing through the 3 o'clock and 9 o'clock is the horizontal direction, and a direction passing through 12 o'clock and 6 o'clock is the vertical direction.

Embodiment 1

The liquid crystal display device of the present embodiment is a liquid crystal display device using the TBA method, out of the traverse field methods in which an electric field (traverse field) in the substrate surface direction is applied to the liquid crystal layer, and an image is displayed by controlling the alignment of the liquid crystal molecules.

Figure 1:
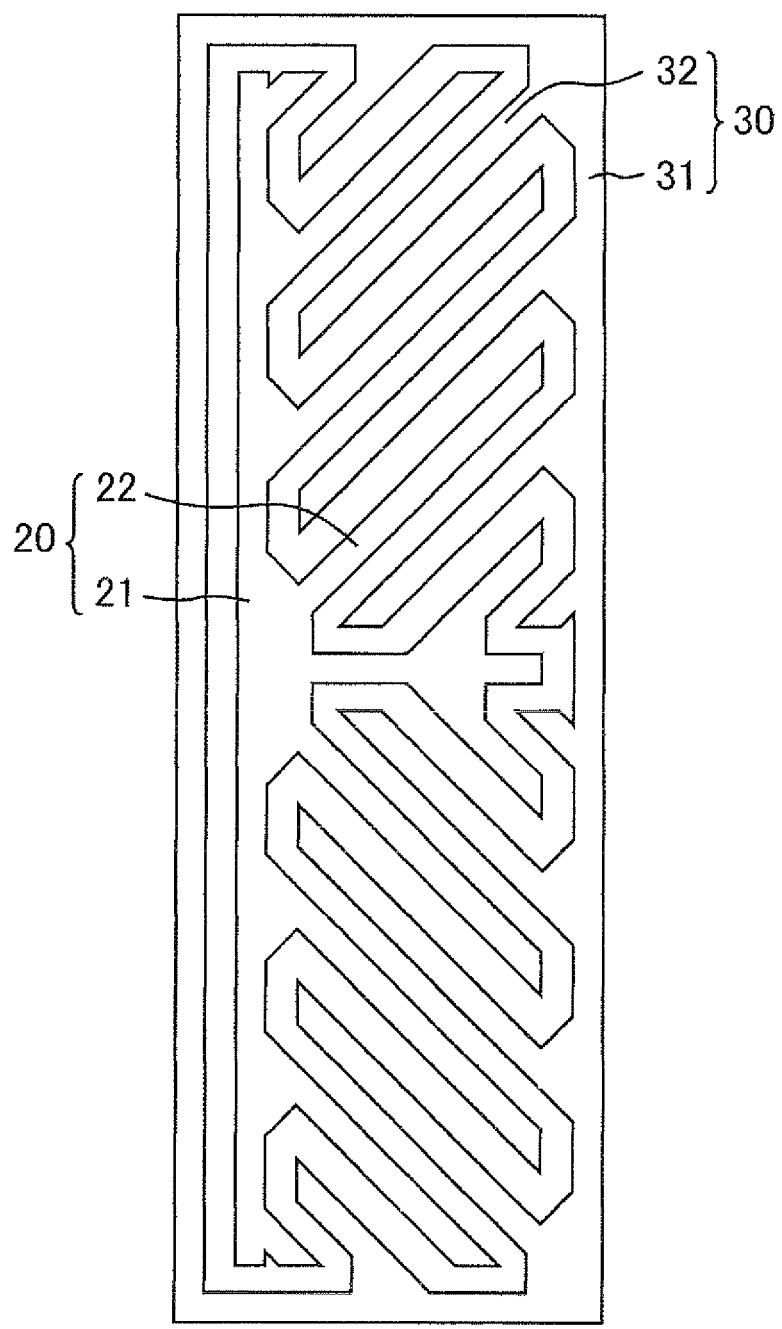
FIG. 1 is a plan view schematically depicting a configuration of a liquid crystal display device of Embodiment 1.

FIG. 1 is a plan view schematically depicting a configuration of the liquid crystal display device of Embodiment 1. In the following drawings, only one or two sub-pixels are illustrated, but a plurality of sub-pixels are disposed in a matrix on the display area (image display area) of the liquid crystal display device of the present embodiment.

The liquid crystal display device of the present embodiment has a liquid crystal display panel, and the liquid crystal display panel has an active matrix substrate (TFT array substrate) and a counter substrate, which are a pair of substrates disposed to face each other, and a liquid crystal layer sandwiched between these substrates.

A pair of linear polarizers are disposed on the main outer surfaces (opposite side of the liquid crystal layer) of the active matrix substrate and the counter substrate. An absorption axis of one of the pair of the linear polarizers is disposed in the vertical direction, and an absorption axis of the other one of the pair of linear polarizers is disposed in the horizontal direction. Thus the pair of linear polarizers are disposed in crossed nicols. The liquid crystal display panel of the present embodiment is a liquid crystal display panel in a normally black mode.

The active matrix substrate and the counter substrate are attached by a sealant surrounding the display area. The active matrix substrate 1 and the counter substrate 2 are disposed to face each other via spacers, such as plastic beads. The liquid crystal layer is formed by a liquid crystal material, which is a display media constituting an optical modulation layer, that is sealed in the gap between the active matrix substrate and the counter substrate.

The liquid crystal layer includes a nematic liquid crystal material (p-type nematic liquid crystal material) having positive dielectric anisotropy. The liquid crystal molecules of the p-type nematic liquid crystal material present homeotropic alignment when no voltage is applied (when an electric field by the later mentioned pixel electrode and common electrode is not generated) by the alignment control force of the vertical alignment film, which is disposed on the surfaces of the active matrix substrate and the counter substrate on the liquid crystal layer side. More specifically, when no voltage is applied, the long axes of liquid crystal molecules of the p-type nematic liquid crystal material, near the vertical alignment film, form an angle of 88° or more (more preferably an angle of 89° or more) with respect to the active matrix substrate and the counter substrate.

Panel retardation $d\Delta n$ (product of a cell gap d and double refractive index $\Delta n$) is preferably 275 nm to 460 nm, and is more preferably 280 nm to 400 nm. In this way, it is preferable that the lower limit of $d\Delta n$ is half the wavelength of green, 550 nm, or more, when a mode is considered, and the upper limit of $d\Delta n$ is in a range which can be compensated by the retardation Rth in a normal line direction of a negative C plate single layer. The negative C plate is disposed to compensate for white floating and/or color tone change which are/is generated when the observation direction is tilted from the normal line direction on the display surface upon displaying black. Rth could be increased by stacking negative C plates, but costs also increase. The dielectric constant $\Delta\in$ of the liquid crystal material is preferably 10 to 25, preferably 15 to 25. It is preferable that the lower limit of $\Delta\in$ is about 10 (more preferably 15) or more, since the white voltage (voltage upon displaying white) is high. The greater $\Delta\in$ the better, since the drive voltage can be decreased more. However it is preferable that the upper limit of $\Delta\in$ is 25 or less if an easily obtainable material is used.

The counter substrate has, on the main surface (at the liquid crystal layer side) of one of the achromatic transparent insulating substrates, a black matrix (BM) layer for shielding light between sub-pixels, a plurality of color layers (color filters) disposed corresponding to sub-pixels, and a vertical alignment film disposed on the surface at the liquid crystal layer side so as to cover these structures. The BM layer is an opaque metal such as Cr, or an opaque organic film such as acrylic resin containing carbon, and is formed in an area corresponding to the boundary area of adjacent sub-pixels. The color layer, on the other hand, is used for color display, and is a transparent organic film, such as an acrylic resin film containing a pigment, and is mainly formed in the sub-pixel area.

In this way, the liquid crystal display device of the present embodiment is a color layer liquid crystal display device (color display active matrix liquid crystal display device) having a color layer on the counter substrate in which one pixel is constituted by three sub-pixels output red light R, green light G and blue light B, respectively. A type and the number of colors of sub-pixels constituting each pixel are not especially limited, and can be set arbitrarily. In other words, in the liquid crystal display device of the present embodiment, each pixel may consist of three colors of sub-pixels: cyan, magenta and yellow, or may consist of four or more colors of sub-pixels.

On the other hand, the active matrix substrate has, on the main surface (at the liquid crystal layer side) of one of the achromatic transparent insulating substrates, gate bus lines, Cs bus lines, source bus lines, TFTs, each of which being a switching element and being disposed in a sub-pixel, drain lines (drains), each of which being connected to the TFT, pixel electrodes 20, each of which being independently disposed in the sub-pixel, a common electrode 30 which is disposed for every sub-pixels, and a vertical alignment film disposed on the surface of the liquid crystal layer side so as to cover these structures.

The vertical alignment films disposed on the active matrix substrate and the counter substrate are formed by coating a known alignment layer material, such as polyimide. The vertical alignment films are normally not processed by rubbing, but can aligns liquid crystal molecules substantially perpendicular to the film surface when no voltage is applied.

On the main surface of the liquid crystal layer side of the active matrix substrate, pixel electrodes 20 are disposed corresponding to each sub-pixel, and a common electrode 30 is disposed continuously (integrally) for all adjacent sub-pixels, as shown in FIG. 1.

Image signals at a predetermined level are supplied from a source bus line (e.g. the width: 5 µm) to the pixel electrode 20 via the thin film transistor (TFT) which is a switching element. The source bus line vertically extends between adjacent sub-pixels. Each pixel electrode 20 is electrically connected to the drain line in the TFT via a contact hole disposed on an interlayer insulating film. A common signal, on the other hand, which are common to each sub-pixel, are supplied to the common electrode 30. The common electrode 30 is connected to a circuit to generate a common signal (common voltage generation circuit), and is set to a predetermined potential.

The source bus line is connected to a source driver (data line drive circuit) outside the display area. The gate bus line (e.g. the width is 5 μm) extends between adjacent sub-pixels in the horizontal direction. The gate bus line is connected to a gate driver (scanning line drive circuit) outside the display area, and is connected to the gate of the TFT within the display area. Pulsed scanning signals are supplied to the gate bus line from the gate driver at a predetermined timing. The scanning signals are applied to each TFT by a sequential line method. The TFT becomes ON state only for a predetermined period by the input of the scanning signals, and the image signals are applied to the pixel electrode 20 connected to the TFT at a predetermined timing while the TFT is in ON state. Thereby the image signals are written in the liquid crystal layer.

After being written to the liquid crystal layer, the image signals are retained between the pixel electrode 20, to which the image signals are applied, and the common electrode 30 which faces the pixel electrode 20 for a predetermined period. In other words, capacitance (liquid crystal capacitance) is formed between the pixel electrode 20 and the common electrode 30 for a predetermined period. In order to prevent leakage of the image signals that are retained, storage capacitance is formed parallel with the liquid crystal capacitance. The storage capacitance is formed, in each sub-pixel, between the drain line of the TFT and the Cs bus line (storage capacitance line, the width is 5 μm, for example). The Cs bus line is disposed parallel with the gate bus line.

The pixel electrode 20 is formed by a transparent conductive film such as an ITO film, or by a metal film such as an aluminum film and chrome film. The shape of the pixel electrode 20 in plan view of the liquid crystal display panel is a comb shape. More specifically, the pixel electrode 20 has a T-shaped trunk portion (connection portion) 21 in plan view, and linear branch portions (comb teeth) 22 in plan view. The trunk portion 21 is disposed in a vertical and 0° direction so as to part the sub-pixel area vertically into two, and the branch portions 22 are connected to the trunk portion 21 and disposed in a 45° or 315° direction.

The common electrode 30 is also formed by a transparent conductive film such as an ITO film, or by a metal film such as an aluminum film, and has a comb shape, in plan view in each sub-pixel. More specifically, the common electrode 30 has a lattice-shaped trunk portion (connection portion) 31 in plan view, and linear branch portions (comb teeth) 32 in plane view. The trunk portion 31 is disposed vertically and horizontally so as to be superposed on the gate bus line and source bus line in plan view, and the branch portions 32 are connected to the trunk portion 31 and disposed in a 135° or 215° direction.

In this way, the branch portion 22 of the pixel electrode 20 and the branch portion 32 of the common electrode 30 have complementary plane shapes, and are disposed alternately with a predetermined distance. In other words, the branch portions 22 of the pixel electrode 20 and the branch portions 32 of the common electrode 30 are disposed facing each other in parallel on the same plane. This means that the comb type pixel electrode 20 and the comb-shaped common electrode 30 are disposed facing each other so that the comb teeth (branch portions 22 and branch portions 32) engage with each other. Thereby the traverse field can be formed at high density between the pixel electrode 20 and the common electrode 30, and the liquid crystal layer can be controlled at higher precision. The pixel electrode 20 and the common electrode 30 have a symmetric plane shape with respect to the horizontal center line, which passes through the center of the sub-pixel.

The branch portions 22 of the pixel electrode 20 and the branch portions 32 of the common electrode 30 extend (elongate) diagonally with respect to the boundary lines (vertical and horizontal directions) between adjacent sub-pixels. The size of the angle of the branch portion 22 of the pixel electrode 20 and the branch portion 32 of the common electrode 30 with respect to the boundary line between adjacent sub-pixels, that is, the size of the angle formed by the direction of the long side of the branch portions 22 and 32 and the boundary line is not especially restricted as long as it is not 90°, but is preferably 45±2° (more preferably 45±1°). If the angle exceeds 45±2°, transmittance may drop.

The end of the branch portion 22 of the pixel electrode 20 is tapered (trapezoidal) and sharpened in plan view along the extending direction (long side direction) of the trunk portion 31 of the common electrode 30. In the same manner, the end of the branch portion 32 of the common electrode 30 is also tapered (trapezoidal) and sharpened in plan view along the extending direction (long side direction) of the trunk portion 21 of the pixel electrode 20. The end of the branch portion 22 of the pixel electrode 20 is surrounded by the trunk portion 31 and the root of the branch portion 32 of the common electrode 30. In the same manner, the end of the branch portion 32 of the common electrode 30 is surrounded by the trunk portion 21 and the root of the branch portion 22 of the pixel electrode 20.

The linked part of the trunk portion 31 and the root of the branch portion 32 at the acute angle side formed by the extending direction of the trunk portion 31 and the extending direction of the branch portion 32 is thicker, so that the distance between the pixel electrode 20 and the common electrode 30 becomes substantially equal. In other words, the linked part of the root of the branch portion 32 (root area), located at the side of the acute angle formed by the long side direction of the trunk portion 31 and the longitudinal direction of the branch portion 32, and the trunk portion 31, is thicker, so that the distance between the pixel electrode 20 and the common electrode 30 becomes substantially equal.

Hereinafter the distance between the pixel electrode and the common electrode (distance between the electrodes) is also called the "electrode spacing", and the gap between the pixel electrode and the common electrode (gap between the electrodes) is also called the "electrode gap".

The electrode gap in an area (gap) corresponding to the acute angle part of the branch portion 22 of the pixel electrode 20 is chamfered. In other words, the electrode gap in the area (portion) surrounding the end of the branch portion 22 is chamfered so that the electrode spacing becomes substantially equal, and as a result, there is no acute angle in the interior angles, in the electrode gap, at the outer line (outside contour) of the area (portion) surrounding the branch portion 22, and only an angle of 90° or greater is formed.

In this way, the electrode gap in the area adjacent to the end of the branch portion 22, that is, the area (portion) adjacent to the end of the branch portion 22 (end portion) in the electrode gap, is chamfered.

The shapes of the common electrode 30 and the pixel electrode 20 near the end of the branch portion 32 of the common electrode 30 are also set in the same manner.

The width (length of the short side direction of the area of which the thickness is constant) of the branch portion 22 of the pixel electrode 20 and the width (length in the short side direction of the area of which the thickness is constant) of the branch portion 32 of the common electrode 30 are substantially the same in the area where the branch portion 22 and the branch portion 32 face each other. In terms of increasing the transmittance, the smaller the widths of the pixel electrode 20 and the common electrode 30 are the better, but according to the current process rule, it is preferable to set them to about 1 to 4 μm (2.5 to 4.0 μm to be more preferable). Hereinafter the widths of the branch portion 22 of the pixel electrode 20 and the branch portion 32 of the common electrode 30 are simply called the "line width L".

The electrode spacing (width of the electrode gap) S is not especially restricted, but is preferably 2.5 to 20.0 μm (more preferably 4.0 to 12.0 μm). The transmittance may drop if the value of 20.0 μm is exceeded or if the value of 2.5 μm is not reached.

Figure 2:
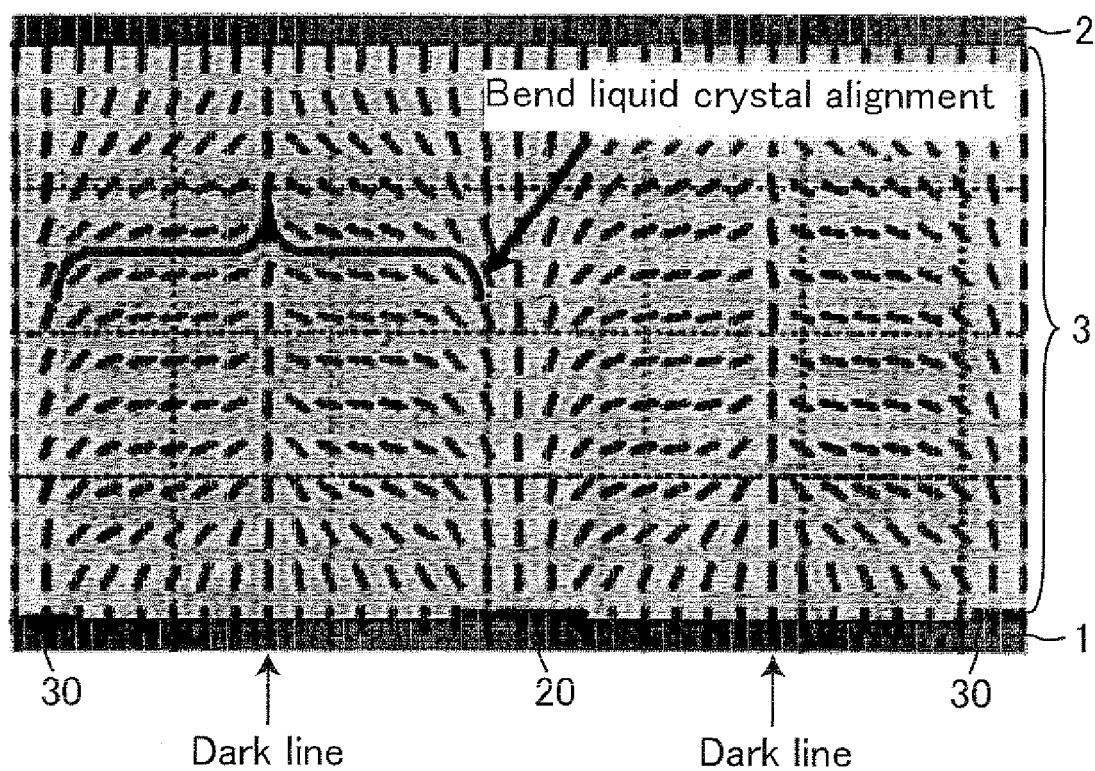
FIG. 2 is a cross-sectional view schematically depicting the alignment distribution of liquid crystals when voltage is applied to the liquid crystal display device of Example 1.

FIG. 2 is a cross-sectional view schematically showing the alignment distribution of liquid crystals when a voltage is applied to the liquid crystal display device of Embodiment 1.

In the liquid crystal display device of the present embodiment, an electric field (traverse field) is generated between the pixel electrode 20 and the common electrode 30 in the surface direction (horizontal direction, direction parallel with the substrate surface) of the substrates (active matrix substrate 1 and counter substrate 2) by applying image signals (voltage) on the pixel electrode 20 via the TFT. Then liquid crystals are driven by this electric field to change the transmittance of each sub-pixel, whereby an image is displayed.

More specifically, the liquid crystal display device of the present embodiment forms a field intensity distribution in the liquid crystal layer 3 by applying the electric field. Thereby the alignment of liquid crystal molecules is distorted. And using this distortion, retardation of the liquid crystal layer 3 is changed. Even more specifically, the initial alignment state of the liquid crystal layer 3 is a homeotropic alignment. Then a bend electric field is formed by applying a voltage on the comb type pixel electrode 20 and the comb type common electrode 30, and generating a traverse field in the liquid crystal layer 3. As a result, as FIG. 2 shows, two domains in which director directions are 180° different from each other are formed, and in each domain, liquid crystal molecules of the nematic liquid crystal material present a bend liquid crystal alignment (bend alignment).

In the area where two domains are adjacent to each other (normally on the center line of the electrode gap), the liquid crystal molecules are always aligned perpendicularly, regardless of the applied voltage value. Therefore in this area, a dark line is always generated regardless of the applied voltage value.

The pixel electrode 20 and the common electrode 30 have two types of branch portions 22 and two types of branch portions 32, respectively, of which extending directions thereof intersect perpendicularly to each other, as shown in FIG. 1. Therefore two kinds of bend electric fields, of which electric field directions intersect perpendicularly to each other, are generated in the liquid crystal layer 3. The two kinds of bend electric fields are formed within one sub-pixel region. In other words, two domains are formed in each type of the branch portions 22 and branch portions 32, so the total of four domains are formed in one sub-pixel. Thereby balanced viewing angle compensation becomes possible in horizontal, vertical and all other directions.

Figure 3:
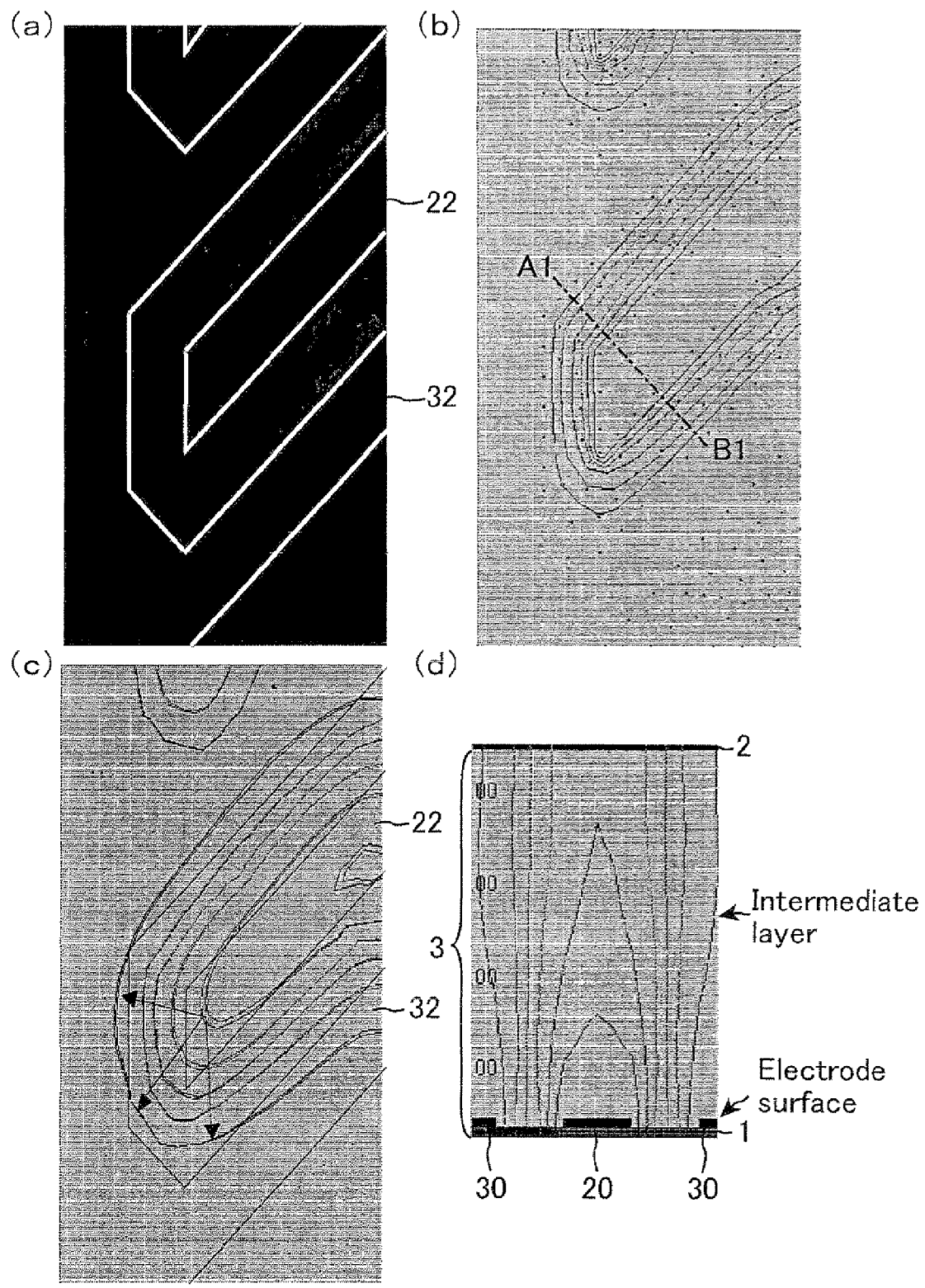
FIG. 3 shows a simulation result of the liquid crystal display device of Embodiment 1, where

FIG. 3 shows the simulation result of the liquid crystal display device of Embodiment 1, where FIG. 3(a) shows a result of an optical simulation (alignment simulation), FIG. 3(b) shows equipotential lines on the surface of the electrode, FIG. 3(c) shows equipotential lines on the intermediate layer of the liquid crystal layer, and FIG. 3(d) shows a cross-section at the A1-B1 line in FIG. 3(b). This simulation is performed under the following simulation conditions. FIG. 3 shows the result when the potential of the pixel electrode 20 is 6.5 V.

(Simulation Conditions)

L/S=4 μm/4 μm (that is, L=4 Ξm, S=4 μm)

pixel electrode: AC (Alternating Current) voltage is applied (amplitude: 0 to 13.0 μm, frequency: 60 Hz); Vc (potential amplitude center) is set to be the same potential as the potential of the common electrode common electrode: DC (Direct Current) voltage 0 V is applied Δn: 0.1 d: 4.0 μm

Δ∈: 19

The potential of the amplitude center refers to the center potential of the amplitude.

As a result, in the liquid crystal display device of the present embodiment, the equipotential lines are substantially uniformly spaced apart from each other in each depth in the liquid crystal layer 3, from the lower-substrate (active matrix substrate 1) side to the upper-substrate (counter substrate 2) side, as shown in FIG. 3(d). In other words, the equipotential lines are substantially equally spaced apart from each other, even in the intermediate layer of the liquid crystal layer 3, as shown in FIG. 3(c). Line width L is relatively large, and equipotential lines in the electrode gap are relatively dense. However a wraparound of the equipotential lines onto the pixel electrode 20 and the common electrode 30 are not generated in the intermediate layer of the liquid crystal layer 3. Since the equipotential lines are equally spaced apart from each other in the area nears the ends of the branch portion 22 and the branch portion 32, liquid crystal molecules are tilted symmetrically with respect to the dark line (area where the liquid crystal molecules are always perpendicularly aligned regardless of the applied voltage value), even in areas near the ends of the branch portion 22 and branch portion 32, as shown in FIG. 3. Therefore the center of liquid crystal alignment in the electrode gap is stabilized in the areas surrounding the ends of the branch portion 22 and branch portion 32, respectively. In other words, as FIG. 3(a) shows, a dark line is always generated in one position in the electrode gap even in the areas near the ends of the branch portion 22 and branch portion 32, and the position of the dark line does not change. Since the area ratio of the two domains, which are adjacent to the dark line and have mutually different optical characteristics, does not change as well, an afterimage is not generated.

The electrode spacing is set to be substantially equal in the areas surrounding the end of the branch portion 22 and the end of the branch portion 32, respectively. Therefore as FIG. 3(c) shows, the generation of the area where an electric field is not applied can be suppressed in the electrode gap near the branch portion 22 and branch portion 32, and as a result, a loss in transmittance can be suppressed.

As described above, the present inventors have discovered that the characteristics shown in the following Table 1 exist in the liquid crystal display device in a TBA mode. In other words, if the equipotential lines are uniformly spaced apart from each other at each depth (particularly in the intermediate layer) in the liquid crystal layer from the lower-substrate side to the upper-substrate side, the center of the liquid crystal alignment (dark line) in the electrode gap always becomes stable, even if grayscale is greatly changed. Hence if the shapes of the ends of the branch portion 22 and branch portion 32, and the shapes of the electrodes in the areas surrounding the ends of the branch portion 22 and branch portion 32 are set so that the equipotential lines are uniformly spaced apart from each other at each depth in the liquid crystal layer from the lower-substrate side to the upper-substrate side, a disturbance in alignment and loss in symmetry of alignment near the ends of the branch portion 22 and branch portion 32, upon change of grayscale, can be suppressed, and as a result, the generation of an afterimage can be suppressed. If the equipotential lines are not uniformly spaced apart from each other at each depth (particularly in the intermediate layer) in the liquid crystal layer from the lower-substrate side to the upper-substrate side, that is, if the electrode shapes are set such that the equipotential lines are not uniformly spaced apart from each other at each depth in the liquid crystal layer from the lower-substrate side to the upper-substrate side, the center of the liquid crystal alignment (dark line) in the electrode gap becomes unstable when grayscale is greatly changed, and an afterimage is easily generated.

TABLE 1

| | Alignment control | | Distance between equipotential lines | |
|---|---|---|---|---|
| | Strong | Weak | Uniform | Nonuniform |
| Afterimage | ○: difficult to be generated | X: likely to be generated | ○: difficult to be generated | X: likely to be generated |

It was also discovered that an afterimage is hardly generated if the alignment control force of the vertical alignment film is strong, and an afterimage tends to be generated easily if it is weak.

Figure 4:
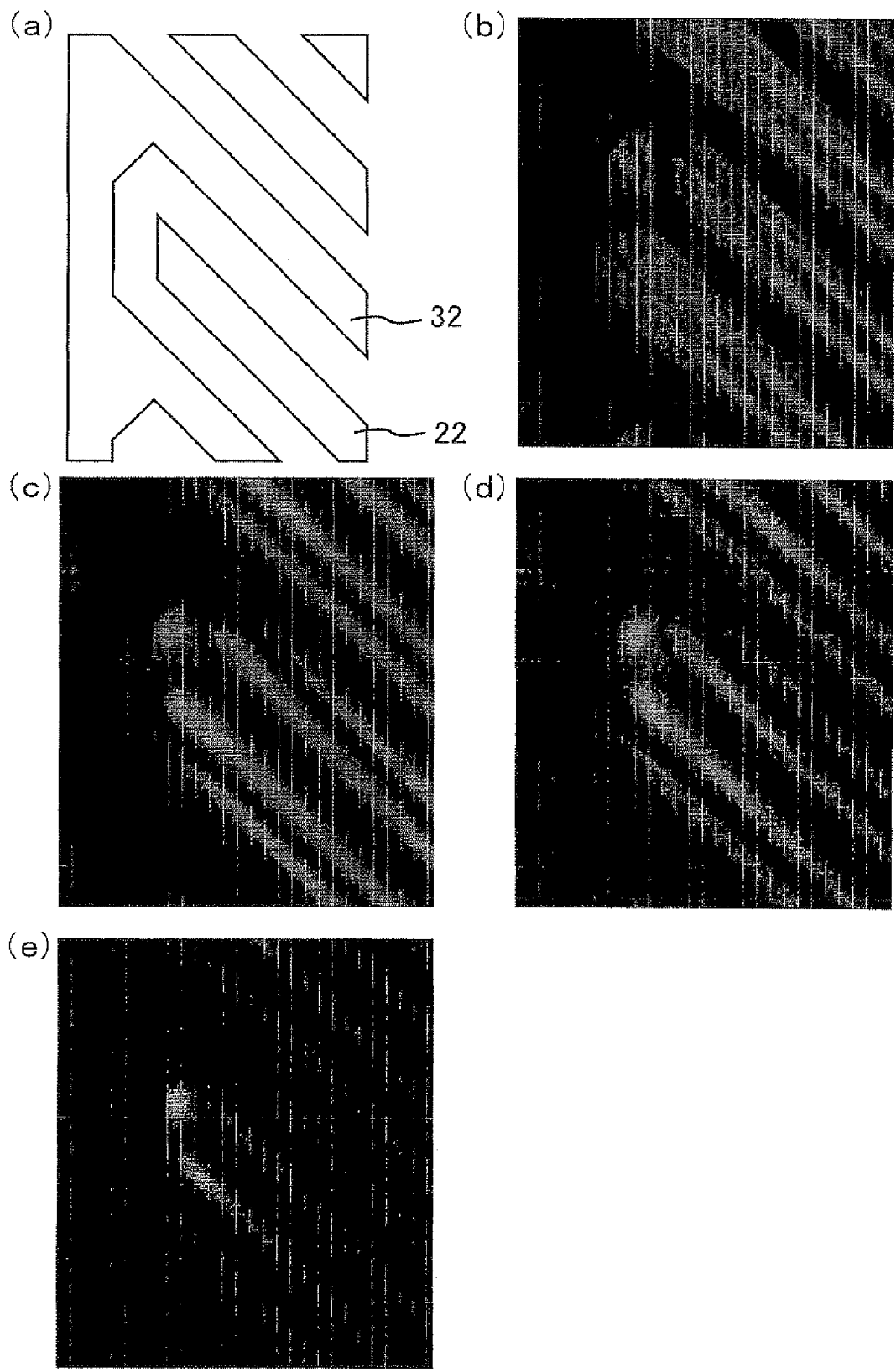
FIG. 4 shows the liquid crystal display device of Embodiment 1, where

FIG. 4 shows the liquid crystal display device of Embodiment 1, where FIG. 4(a) is a plan view schematically depicting a configuration, and FIGS. 4(b) to 4(e) show optical microphotographs. The optical microscope observation is performed by fabricating a panel which satisfies the above mentioned simulation conditions. For the liquid crystal material, MJ08356 (made by Merck and Co.) was used, and for the alignment layer material, AL61960 (made by JSR) was used. FIG. 4(b) shows the result when the potential of the pixel electrode 20 is 6.5 V, FIG. 4(c) shows the result when the potential of the pixel electrode 20 is 3.5 V, FIG. 4(d) shows the result when the potential of the pixel electrode 20 is 2.5 V, and FIG. 4(e) shows the result when the potential of the pixel electrode 20 is 2.0 V.

According to the liquid crystal display device of the present embodiment, the generation of the area where an electric field is not applied is suppressed in the electrode gap near the branch portion 22 and branch portion 32, as shown in FIG. 3(c). Therefore as FIG. 4(b) shows, the loss of transmittance near the ends of the branch portion 22 and the branch portion 32 can be effectively suppressed. Furthermore as FIGS. 4(b) to 4(e) show, the center of liquid crystal alignment (dark line) in the electrode gap stabilizes in all the voltage applied states, and the generation of an afterimage can be suppressed.

According to the liquid crystal display device of the present embodiment, the electrode spacing S is substantially set to be uniform in areas surrounding the ends (end portions) of the branch portion 22 of the pixel electrode 20 and the branch portion 32 of the common electrode 30, respectively.

In other words, the distance between the end (end portion) of the branch portion 22 and the common electrode 30 is substantially equal in an area surrounding the end of the branch portion 22.

In the same manner, the distance between the end (end portion) of the branch portion 32 and the pixel electrode 20 may be substantially equal in an area surrounding the end of the branch portion 32.

Thereby liquid crystal molecules are always tilted symmetrically with respect to the dark line even in areas near the ends of the branch portion 22 and the branch portion 32, and the center of the liquid crystal alignment in the electrode gap in areas near the ends of the branch portion 22 and the branch portion 32 is stabilized. As a result, the generation of an afterimage can be effectively suppressed.

In the case of using a pair of linear polarizers, transmittance increases as fewer liquid crystal molecules tilt in the parallel (horizontal) or vertical direction with respect to the absorption axis of the pair of linear polarizers in the plan view of the panel. The liquid crystal molecules which tilt in the parallel or vertical direction with respect to the absorption axis are generated near the ends of the branch portion 22 and branch portion 32. In the case of the liquid crystal display device of the present embodiment, the number of ends of the branch portions 22 and branch portions 32 can be decreased compared with the later mentioned configuration in FIG. 10. In other words, the number of liquid crystal molecules which tilt in the parallel or vertical direction with respect to the absorption axis can be decreased, so the present embodiment is a configuration which can easily increase transmittance. Hence the liquid crystal display device of the present embodiment is suitable for a liquid crystal display device having small sub-pixels in which an increase in transmittance is difficult.

According to the liquid crystal display device of the present embodiment, vertical and horizontal viewing angle characteristics can be symmetric, since one sub-pixel has four domains.

Only the electrode spacing S may substantially be uniform in an area surrounding one end of the branch portion 22 of the pixel electrode 20 and the branch portion 32 of the common electrode 30. However in terms of suppressing the generation of an afterimage in a wide range of the sub-pixel, it is preferable that the electrode spacing S may substantially be uniform in the areas surrounding the end of the branch portion 22 of the pixel electrode 20 and the end of the branch portion 32 of the common electrode 30, respectively.

According to the present embodiment, the electrode spacing S needs not to be exactly uniform in the areas surrounding the end of the branch portion 22 and the end of the branch portion 32, respectively. In the case of the example in FIG. 1, the electrode gap in the area connecting the corners of the pixel electrode 20 and the common electrode 30 is slightly larger than the electrode gap in the area connecting the sides of the pixel electrode 20 and the common electrode 30. In other words, the distance (corner spacing) between the corner of the pixel electrode 20 and the corner of the common electrode 30 facing this corner is slightly larger than the distance (side spacing) between the side portion of the pixel electrode 20 and the side portion of the common electrode 30 facing the side portion of the pixel electrode 20. However as FIG. 3 shows, the equipotential lines are substantially uniformly spaced apart from each other at each depth in the liquid crystal layer, from the lower-substrate side to the upper-substrate side (particularly in the intermediate layer), even if the electrode spacing S is not perfectly uniform in the areas surrounding the end of the branch portion 22 and the end of the branch portion 32, respectively, therefore the generation of an afterimage can be suppressed.

If the electrode spacing is substantially uniform, like the case of FIG. 1, the above mentioned corner spacing is always $\sqrt{2}$ times the side spacing or less. In this case, the electric field applied to the area (uniform distance area) between the side portion of the pixel electrode 20 and the side portion of the common electrode 30 facing the side portion of the pixel electrode 20 is enhanced compared to the electric field applied to an area other than the uniform distance area. Therefore the liquid crystal molecules in the uniform distance area move fast, and the liquid crystal molecules in the area (area other than the uniform distance area) where the electrode spacing is greater than that in the uniform distance area move after the liquid crystal molecules in the uniform distance area move. However the speed of movement of the liquid crystal molecules in an area other than the uniform distance area is faster than the generation speed (slowness) of an afterimage. The liquid crystal molecules in a portion of the electrode spacing with the greatest width are mainly tilted (standing up) vertically. In other words, the liquid crystal molecules are tilted (standing up) in the parallel or perpendicular direction with respect to the absorption axis (transmission axis) of the polarizer. Therefore the liquid crystal molecules in this portion have little influence on a transmittance change (afterimage).

According to the present embodiment, the electrode gaps in the areas adjacent to the ends of the branch portion 22 and branch portion 32, that is, the areas (portions) adjacent to the ends of the branch portion 22 and branch portion 32 in the electrode gap are chamfered. Hence the electrode spacings S in the end portions of the branch portion 22 of the pixel electrode 20 and the branch portion 32 of the common electrode 30 can be substantially set to be equal in width so that an afterimage is not generated, and as a result, the generation of an afterimage can be suppressed.

Figure 5:
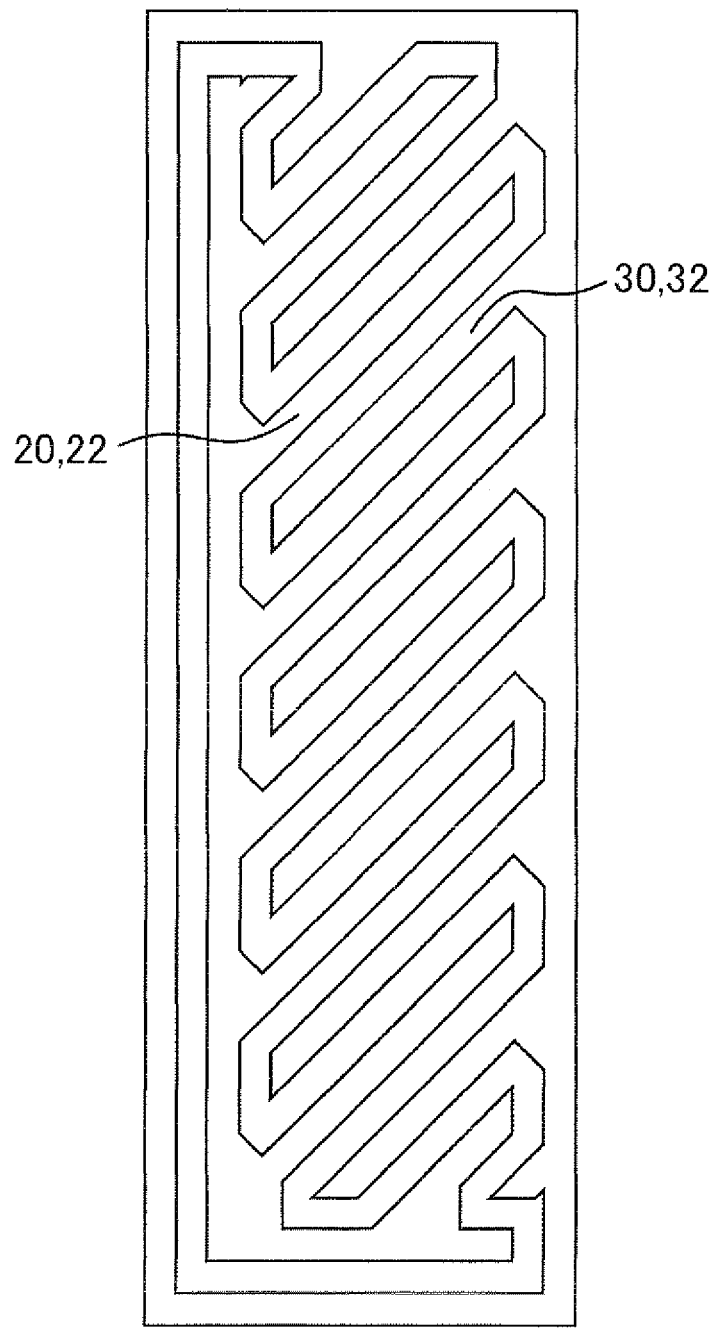
FIG. 5 is a plan view schematically depicting another configuration of the liquid crystal display device of Embodiment 1.

FIG. 5 is a plan view schematically depicting another configuration of the liquid crystal display device of Embodiment 1.

The branch portions 22 of the pixel electrode 20 may be disposed only in a 45° direction, and the branch portions 32 of the common electrode 30 may be disposed only in a 225° direction. In other words, the sub-pixel of the present embodiment may have two domains. Thereby the generation of an afterimage can be suppressed.

Figure 6:
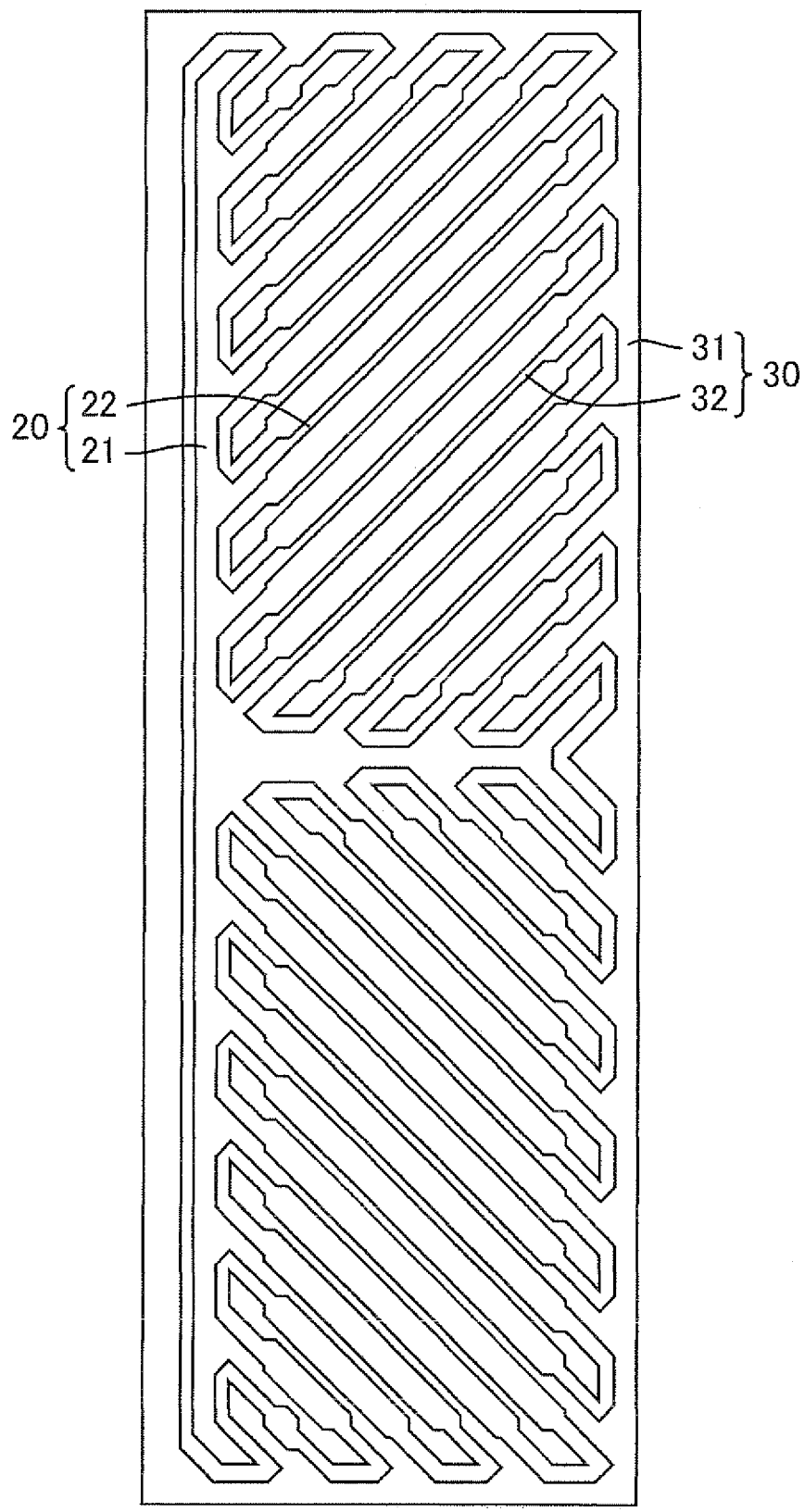
FIG. 6 is a plan view schematically depicting another configuration of the liquid crystal display device of Embodiment 1.
Figure 7:
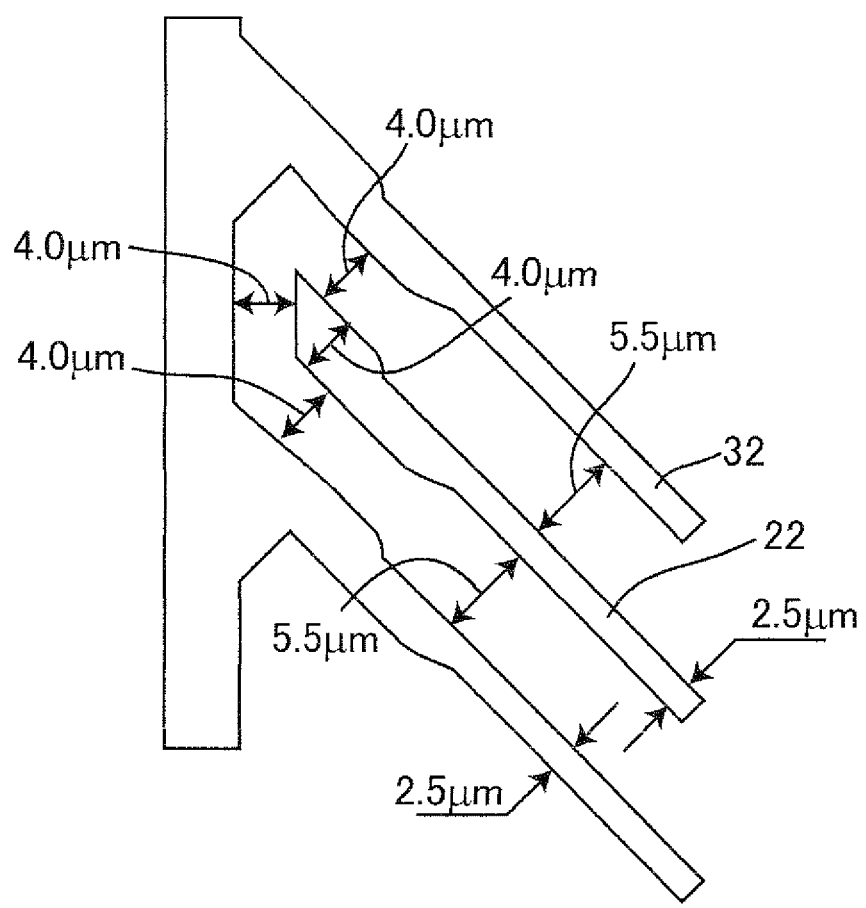
FIG. 7 is an enlarged plan view schematically depicting the configuration of the liquid crystal display device of Embodiment 1 shown in FIG. 6.

FIG. 6 is a plan view schematically depicting another configuration of the liquid crystal display device of Embodiment 1. FIG. 7 is an enlarged plan view schematically depicting the configuration of the liquid crystal display device of Embodiment 1 shown in FIG. 6.

As FIG. 6 shows, the branch portions 22 of the pixel electrode 20 and the branch portions 32 of the common electrode 30 each may have two kinds of widths, and the width of the center portion, other than the end and root, may be smaller than that of the end and root. In other words, the electrode spacing S in the center portion, other than the end (root) of each of the branch portions 22 and branch portions 32, may be greater than that of the electrode spacing S in the end (root) of each of the branch portions 22 and the branch portions 32.

In this way, the width of the end of the branch portion 22 and the width of the center portion of the branch portion 22 are different, and the width of the common electrode 30 in the area surrounding the end of the branch portion 22 is different from the width of the center portion of the branch portion 32. In other words, the width of the end (end portion) of the branch portion 22 and the width of the center portion of the branch portion 22 are different, and the width of the common electrode 30 in an area surrounding the end (end portion) of the branch portion 22 (normally the root area of the branch portion 22 and trunk portion 21) is different from the width of the center portion of the branch portion 32.

In the same manner, the width of the end of the branch portion 32 and the width of the center portion of the branch portion 32 are different, and the width of the pixel electrode 20 in the area surrounding the end of the branch portion 32 is different from the width of the center portion of the branch portion 22. In other words, the width of the end (end portion) of the branch portion 32 and the width of the center portion of the branch portion 32 are different, and the width of the pixel electrode 20 in an area surrounding the end (end portion) of the branch portion 32 (normally the root area of the branch portion 32 and trunk portion 31) is different from the width of the center portion of the branch portion 22.

For example, as FIG. 7 shows, L/S of the ends and roots of the branch portion 22 and branch portion 32 is set to 4.0 µm/4.0 µm, while L/S of the center areas, other than the ends and roots of the branch portion 22 and branch portion 32, is set to 2.5 µm/5.5 µm.

The center portion is a portion excluding the end portion and root portion, and is preferably a portion positioned substantially at the center of the branch portion in the long side direction.

Table 2 shows the panel transmittance when L/S is changed. Table 3 shows the relationship of L/S and panel transmittance. As Table 2 shows, the transmittance increases as the electrode spacing S increases, in a range where the electrode spacing S is not too wide. In other words, as Table 3 shows, the density of the equipotential lines becomes low as the electrode spacing S increases, but the transmittance increases since the area where the liquid crystal molecules tilt in the substrate surface direction increases in the electrode gap. If the electrode spacing S becomes too wide, however, the density of the equipotential lines decreases too much, and transmittance drops. If the electrode spacing S is decreased, the density of the equipotential lines increases, but transmittance decreases because the area where the liquid crystal molecules tilt in the substrate surface direction decreases in the electrode gap. If the line width L is increased, a wraparound of the equipotential lines onto the pixel electrode 20 and common electrode 30 can be decreased in the intermediate layer of the liquid crystal layer, whereas if the line width L is decreased, a wraparound of the equipotential lines onto the pixel electrode 20 and common electrode 30 increases in the intermediate layer of the liquid crystal layer.

TABLE 2

| Pixel pattern | L/S size (µm) | | | | | |
| --- | --- | --- | --- | --- | --- | --- |
| | (1) 2.5/3.5 | (2) 2.5/4.0 | (3) 2.5/5.0 | (4) 2.5/7.5 | (5) 4.0/4.0 | (6) 4.0/12.0 |
| Transmittance | 1.81% | 1.96% | 2.04% | 2.18% | 2.10% | 1.71% |

TABLE 3

| | | Equipotential lines | Transmittance |
| --- | --- | --- | --- |
| Spacing S | Large | Thick | High: Area where liquid crystal molecules tilt: large (but not too large) |
| | Small | Dense | Low: Area where liquid crystal molecules tilt: small |
| Spacing L | Large | Wraparound: small | |
| | Small | Wraparound: large | |

According to the configuration shown in FIG. 6, the large electrode gap can be secured in the center areas of the branch portion 22 and branch portion 32, which has no influence on the generation of an afterimage, so the pixel aperture ratio can be increased, and transmittance can be increased. The widths of the end/root area and the center portion of the branch portion 22 are different. In the same manner, the widths of the end/root area and the center portion of the branch portion 32 are different. Therefore while the end/root area can be set to L/S, which is effective to suppress an afterimage, the center portion can be set to L/S whereby transmittance can be maximized.

According to the configuration shown in FIG. 6, just like the configuration shown in FIG. 1, the number of ends of the branch portions 22 and branch portion 32 can be decreased. In other words, the number of liquid crystal molecules which tilt in a parallel or perpendicular direction with respect to the absorption axis of the liner polarizer can be decreased. Therefore the configuration shown in FIG. 6 can easily increase transmittance. Hence this configuration is also suitable for a liquid crystal display device having small sub-pixels with which an increase in transmittance is difficult.

FIG. 8 shows the simulation result of the liquid crystal display device of Embodiment 1 shown in FIG. 6, where FIG. 8(a) shows the result of optical simulation (alignment simulation), FIG. 8(b) shows equipotential lines on the electrode surface, and FIG. 8(c) shows equipotential lines on the intermediate layer of the liquid crystal layer. This simulation is performed under the above mentioned simulation conditions, except that L/S in the ends and roots of the branch portion 22 and branch portion 32 is set to 4.0 μm/4.0 μm, and L/S in the center portions, other than the ends and roots, of the branch portion 22 and branch portion 32 is set to 2.5 μm/5.5 μm. FIG. 8 shows the result when the potential of the pixel electrode 20 is 6.5 V.

As a result, in this case as well, the equipotential lines are substantially uniformly spaced apart from each other in each depth in the liquid crystal layer, from the lower substrate (active matrix substrate) side to the upper-substrate (counter substrate) side. In other words, as FIG. 8(c) shows, the equipotential lines are substantially equally spaced apart from each other in the intermediate layer of the liquid crystal layer. In the end portions of the branch portion 22 and branch portion 32, a line width L is relatively large, and the equipotential lines in the electrode gap are relatively dense. However, no wraparound of equipotential lines onto the pixel electrode 20 and common electrode 30 is generated in the intermediate layer of the liquid crystal layer.

The distances between the pixel electrode 20 and the common electrode 30 changes toward the ends of the branch portion 22 and branch portion 32 while axisymmetric contours of the pixel electrode 20 and the common electrode 30 with respect to the center line of the electrode gap are maintained. In other words, in the pixel electrode 20 and the common electrode 30, the electrode spacing changes from the center portion to the end of the branch portion 22, so as to have axisymmetric contours of the pixel electrode 20 and the common electrode 30 (plan view) with respect to the center line of the electrode gap. In the same manner, in the pixel electrode 20 and common electrode 30, the electrode spacing changes from the center portion to the end of the branch portion 32, so as to have axisymmetric contours (plan view) with respect to the center line of the electrode gap. Therefore as FIG. 8(c) shows, the distance between the equipotential lines is increased smoothly and evenly from the end (root) to the center portion of the branch portion 22 and branch portion 32. Since the equipotential lines are uniformly spaced apart from each other, even in an area where the electrode spacing S changes, liquid crystal molecules always tilt symmetrically with respect to the dark line, even in the area where the electrode spacing S changes. In other words, a dark line is always generated in one position in the electrode gap, so that the position of the dark line does not change, even in the area where the electrode spacing S changes. As a result, as FIG. 8(a) shows, the center of the liquid crystal alignment stabilizes in the area where the electrode spacing S changes, and the generation of an afterimage in the area where the electrode spacing S changes can be suppressed.

FIG. 9(a) shows an optical microphotograph of the liquid crystal display device of Embodiment 1 shown in FIG. 6, and FIG. 9(b) is an enlarged view of the area near the end of the branch portion of the pixel electrode in FIG. 9(a). For optical microscope observation, a liquid crystal display device fabricated in the same way as the liquid crystal display device shown in FIG. 4 is used, except that the pixel layout is changed. FIG. 9 is a result when the potential of the pixel electrode 20 is 6.5 V.

As FIG. 9(a) shows, transmittance is increased since the electrode gap is increased in the center portion (e.g. area enclosed by the white circle in FIG. 9(a)) of the branch portion 22 and branch portion 32, which has no influence on the generation of an afterimage. As FIG. 9(b) shows, the dark line (area where liquid crystal molecules are always aligned perpendicularly regardless of the applied voltage value) is uniform in the areas near the ends of the branch portion 22 and branch portion 32. In other words, the dark line in the areas near the ends of the branch portion 22 and branch portion 33 is always in a constant position in the electrode gap (see the white line area in FIG. 9(b)). Therefore no afterimage is generated. Furthermore the generation of an area where an electric field is not applied can be suppressed in the electrode gap near the ends of the branch portion 22 and branch portion 32, and the loss of transmittance in an area near the ends of the branch portion 22 and the branch portion 32 can be effectively suppressed (see the area enclosed by the white circle in FIG. 9(b)).

Figure 10:
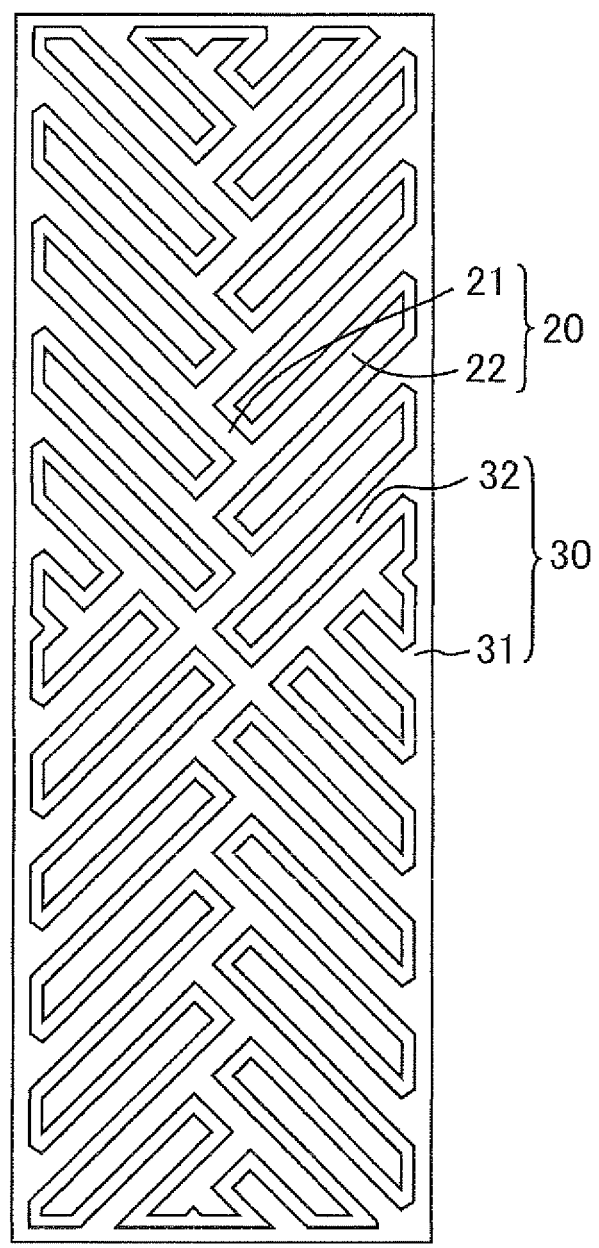
FIG. 10 is a plan view schematically depicting another configuration of the liquid crystal display device of Embodiment 1.

FIG. 10 is a plan view schematically depicting another configuration of the liquid crystal display device of Embodiment 1.

As FIG. 10 shows, the pixel electrode 20 may be a comb type electrode in plan view, having a trunk portion 21 periodically bending zigzag at an substantially 90° bending angle in a 45° direction or 135° direction, and linear branch portions 22 in plan view connected to the bent section of the trunk portion 21 and disposed in a 45°, 135°, 225° or 315° direction.

The common electrode 30 may be a comb type electrode in plan view, having a lattice-shaped trunk portion 31 which is planarly disposed in the vertical and horizontal directions so as to be superimposed on the gate bus line and source bus line, and linear branch portions 32 in plan view connected to the trunk portion 31 and disposed in a 45°, 135°, 225° or 315° direction.

In this case, the pixel electrode 20 and the common electrode 30 have two kinds of branch portions 22 and two kinds of branch portions 32, respectively, of which extending directions intersect perpendicularly with each other, as shown in FIG. 10. Therefore two kinds of bend electric fields, of which field directions intersect perpendicularly with each other, are generated in the liquid crystal layer. The two kinds of bend electric fields are formed in one sub-pixel. Since two domains are formed in each kind of the branch portions 22 and branch portions 32, a total of four domains are formed in one sub-pixel. Hence in this case as well, a balanced viewing angle compensation in the vertical, horizontal and all other directions can be implemented.

At this time, just like the configuration shown in FIG. 1, the plane shape of the end of the branch portion 22 of the pixel electrode 20 is tapered (trapezoidal) and sharpened along the extending direction of the trunk portion 31 of the common electrode 30. The plane shape of the end of the branch portion 32 of the common electrode 30, on the other hand, is not tapered and not sharpened but square. The end of the branch portion 32 is surrounded by the trunk portion 21 and root of the branch portion 22 of the pixel electrode 20 disposed in a square shape (U shape, squared U shape to be more precise) in plan view, so that the electrode spacing becomes substantially equal.

Figure 11:
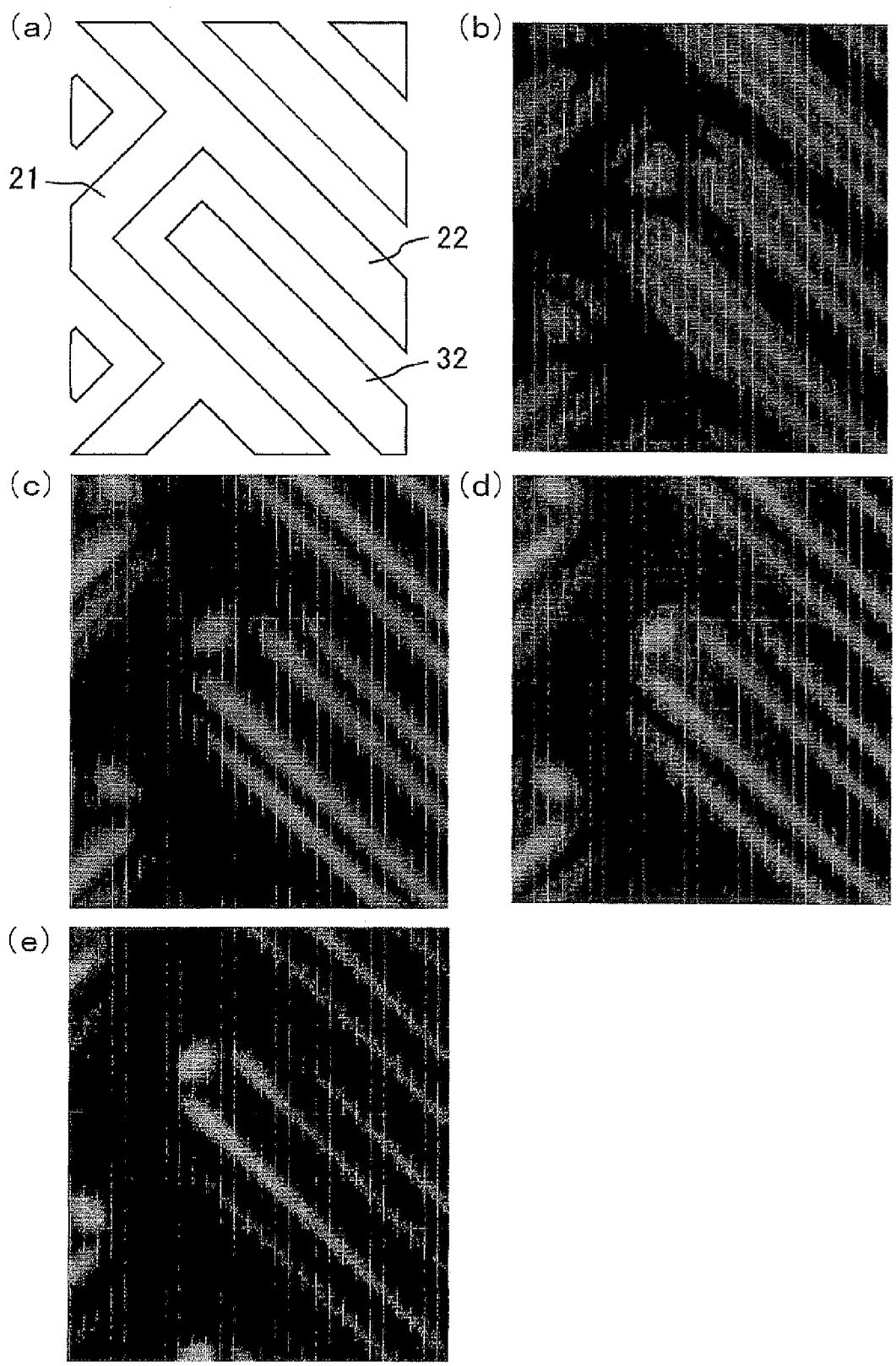
FIG. 11 shows the liquid crystal display device of Embodiment 1 shown in FIG. 10, where FIG. 11(*a*) is a schematic plan view, and FIGS. 11(*b*) to 11(*e*) show optical microphotographs.

FIG. 11 shows the liquid crystal display of Embodiment 1 as shown in FIG. 10, where FIG. 11(a) is a schematic plan view, and FIGS. 11(b) to 11(e) are optical microphotographs. For optical microscope observation, the liquid crystal display device fabricated in the same way as the liquid crystal display device shown in FIG. 4, except that the pixel layout is changed, is used. FIG. 11(b) is a result when the potential of the pixel electrode 20 is 6.5V, FIG. 11(c) is a result when the potential of the pixel electrode 20 is 3.5 V, FIG. 11(d) is a result when the potential of the pixel electrode 20 is 2.5V, and FIG. 11(e) is a result when the potential of the pixel electrode 20 is 2.0 V.

In this configuration as well, the electrode spacing S between the pixel electrode 20 and the common electrode 30 is set to be substantially uniform in an area surrounding the end of the branch portion 32. Therefore as FIGS. 11(b) to 11(e) shows, the center of the liquid crystal alignment (dark line) in the electrode gap is stabilized in all the voltage applied states, and the generation of an afterimage can be suppressed.

For the area near the end of the branch portion 22 of the pixel electrode 20, the gap between the pixel electrode 20 and the common electrode 30 is chamfered so that the electrode spacing is substantially uniform, just like the configuration shown in FIG. 1. Therefore in this area as well, the generation of an afterimage can be suppressed.

The electrode spacing in the area surrounding the end of the branch portion 32 of the common electrode 30 is set to be substantially equal. Therefore as FIG. 11(b) shows, the generation of an area where an electric field is not applied can be suppressed in the electrode gap in an area near the end of the branch portion 32 and the common electrode 30, and as a result, the loss of transmittance can be suppressed.

In the case of this configuration, the number of ends of the branch portions 22 and the branch portions 32 increases easily, compared with the configuration shown in FIG. 1. In other words, if this configuration is used, the number of liquid crystal molecules which tilt in the parallel or perpendicular direction with respect to the absorption axis increases easily, and transmittance does not increase easily. Therefore this configuration is suitable for a liquid crystal display device having large sub-pixels, with which transmittance can easily be increased. According to this configuration, yield can be increased. This is because, compared with the configuration shown in FIG. 1, a longer distance can be taken between the trunk portion 21 of the pixel electrode 20 and the trunk portion 32 of the common electrode 30, and a leak failure can be reduced, in this configuration. In the case of a leak in the branch portion, defective areas can be minimized by disconnecting a leaking branch portion, but in the case of a leak in a trunk portion, a leaking trunk portion and branch portion become defective areas.

In this configuration as well, one sub-pixel has four domains, so viewing angle characteristics in the horizontal and vertical directions can be symmetric.

Figure 12:
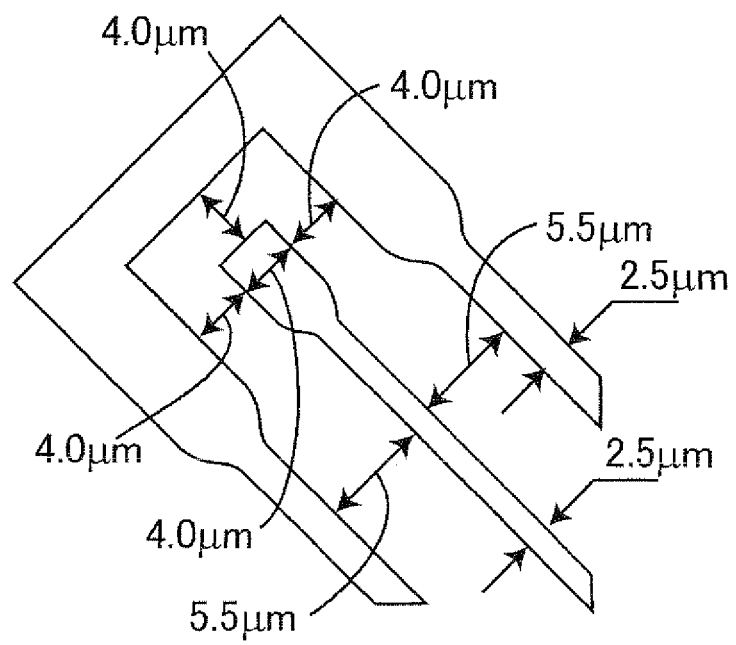
FIG. 12 is a plan view schematically depicting another configuration of the liquid crystal display device of Embodiment 1.

FIG. 12 is a plan view schematically depicting another configuration of the liquid crystal display device of Embodiment 1.

For the configuration shown in FIG. 11 as well, the branch portion 22 of the pixel electrode 20 and the branch portion 32 of the common electrode 30 each may have two kinds of widths, and the width of the center portion, other than the end and root area, may be smaller than that of the end and root, as shown in FIG. 12. In other words, the width of the electrode spacing S in the center portion other than the end (root) of each of the branch portion 22 and branch portion 32 may be greater than that of the electrode spacing S in the end (root) of each of the branch portion 22 and branch portion 32. For example, the L/S of the branch portion 22 and branch portion 32 at the end and root is set to 4.0 μm/4.0 μm, while the L/S of the branch portion 22 and branch portion 32 at the center areas, other than the ends and roots, is set to 2.5 μm/5.5 μm. Since a large electrode gap can be secured in the center portion of the branch portion 22 and branch portion 32, which has no influence on the generation of an afterimage, the pixel aperture ratio can be increased, and transmittance can be increased. The widths of the end/root and the center portion of the branch portion 22 are different. In the same manner, the widths of the end/root and the center portion of the branch portion 32 are different. Therefore the L/S can be set to maximize transmittance in the center area, while the L/S can be set to be effective for suppressing an afterimage, in the end and root.

The distance between the pixel electrode 20 and the common electrode 30 changes toward the end of the branch portion 22 and the end of the branch portion 32, while axisymmetric contours of the electrodes with respect to the center line of the electrode gap are maintained. Therefore just like the configuration shown in FIG. 6, the distance between the equipotential lines can be increased smoothly and evenly from the end (root) to the center portion of the branch portion 22 and branch portion 32. Therefore the equipotential lines are uniformly spaced apart from each other even in an area where the electrode spacing S changes, and liquid crystal molecules can always be tilted symmetrically with respect to the dark line even in areas where the electrode spacing S changes. In other words, the dark line can always be generated in one position in the electrode gap so that the position of the dark line does not change, even in the area where the electrode spacing S changes. As a result, the center of the liquid crystal alignment can be stabilized in the area where the electrode spacing S changes, and the generation of an afterimage in the area where the electrode spacing S changes can be suppressed.

Figure 13:
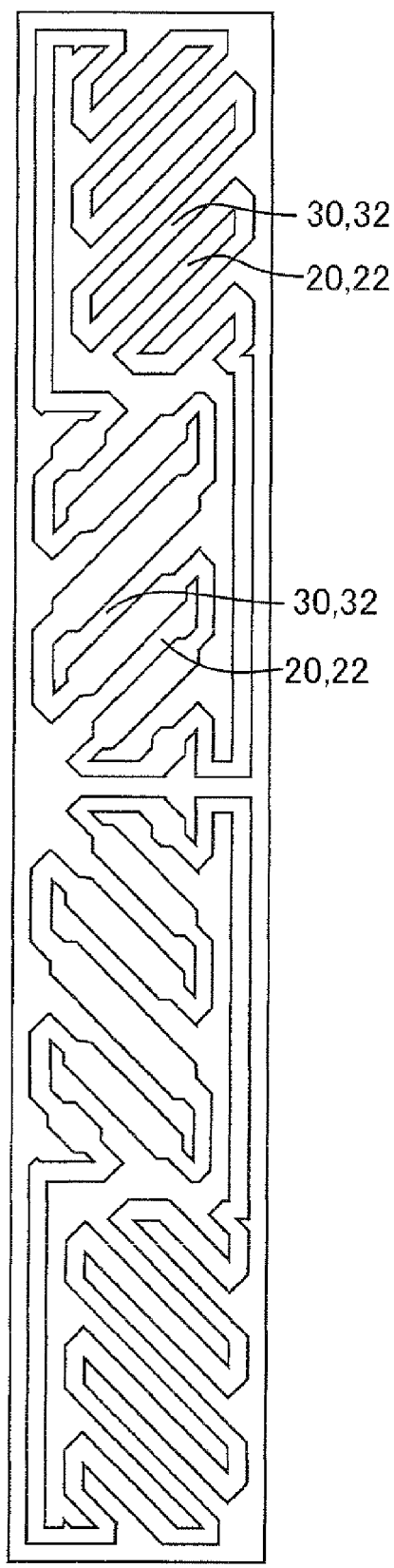
FIG. 13 is a plan view schematically depicting another configuration of the liquid crystal display device of Embodiment 1.

FIG. 13 is a plan view schematically depicting another configuration of the liquid crystal display device of Embodiment 1.

As FIG. 13 shows, the L/S of the branch portion 22 of the pixel electrode 20 and the branch portion 32 of the common electrode 30 may be constant in the end/root and the center portion of the half area of the sub-pixel, but in the other half area of the sub-pixel, the line width L may be smaller and the electrode spacing S is greater in the center portion than in the end/root. In other words, this configuration is a combination of the characteristics of the configuration in FIG. 1 and the configuration in FIG. 6 within one sub-pixel. By creating a plurality of L/Ss within one sub-pixel like this, a plurality of V (voltage)–T (transmittance) characteristics exist in one sub-pixel. As a result, a "white float phenomena", which is generated when the viewing angle is tilted in the diagonal direction from the front face direction, can be suppressed.

Since each sub-pixel has a branch portion 22 and branch portion 32 disposed in a 45° or 135° direction, two domains are created in each sub-pixel. However the branch portion 22 and the branch portion 32 intersect perpendicularly in two adjacent sub-pixels, so in this configuration, four domains are created in two adjacent sub-pixels. Hence the viewing angle characteristics can be symmetric vertically and horizontally.

Figure 14:
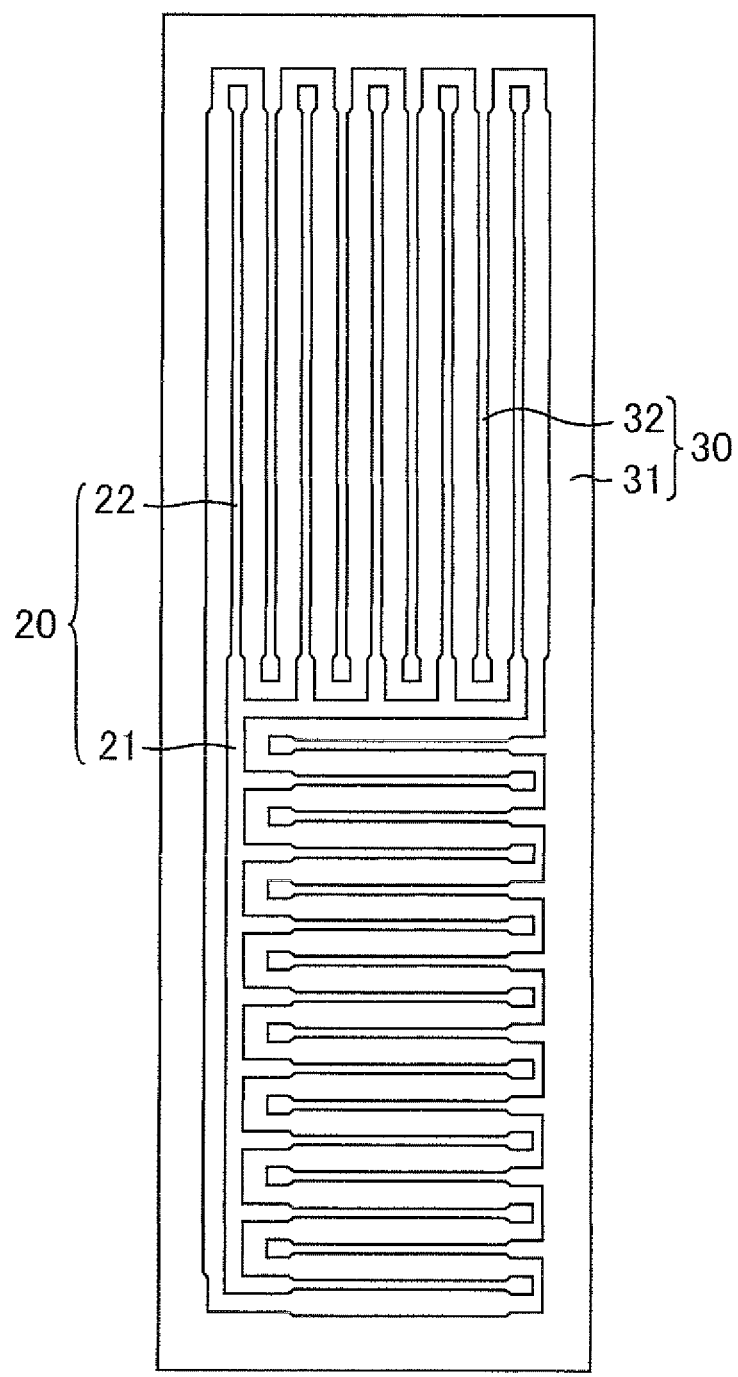
FIG. 14 is a plan view schematically depicting another configuration of the liquid crystal display device of Embodiment 1.

FIG. 14 is a plan view schematically depicting another configuration of the liquid crystal display device of Embodiment 1.

As FIG. 14 shows, the pixel electrode 20 may be a comb type electrode in plan view, having an inverted-L-shaped trunk portion 21 which is disposed vertically and in a 0° direction in plan view, and a linear branch portion 22 in plan view connected to the trunk portion 21 and disposed in a 0° or 90° direction, so as to equally part the pixel area vertically into two.

The common electrode 30 may be a comb type electrode in plan view, having a lattice-shaped trunk portion 31 planarly disposed vertically and horizontally so as to be superimposed on the gate bus line and source bus line, and a linear branch portion 32 in plan view connected to the trunk portion 31 and disposed in a 180° or 270° direction.

At this time, one absorption axis of a pair of polarizers disposed in crossed-nicols is disposed in a 45° direction, and the other absorption axis of the pair of polarizers is disposed in a 135° direction.

In this case, the pixel electrode 20 and the common electrode 30 have two kinds of branch portions 22 and two kinds of branch portions 32, respectively, of which extending directions intersect perpendicularly with each other, as shown in FIG. 14. Therefore two kinds of bend electric fields, of which field directions intersect perpendicularly with each other, are generated in the liquid crystal layer 3. The two kinds of bend type fields are formed in one sub-pixel. Since two domains are formed in each kind of the branch portion 22 and branch portion 32, a total of four domains are formed in one sub-pixel. Hence in this case as well, balanced viewing angle compensation in the vertical, horizontal and all other directions can be implemented.

At this time, the plane shapes of the ends of the branch portion 22 of the pixel electrode 20 and the branch portion 32 of the common electrode 30 are not tapered and sharpened but square. The ends of the branch portion 22 and the branch portion 32 are surrounded by the common electrode 30 and the pixel electrode 2, respectively, which are disposed in a square shape (U shape, squared U shape to be more precise) in plan view, so that the electrode spacing becomes substantially equal.

In this configuration as well, the electrode spacing S between the pixel electrode 20 and the common electrode 30 is substantially set to be equal in areas surrounding the end of the branch portion 22 and the end of the branch portion 32, respectively. Therefore just like the case of an area near the end of the common electrode 30 (branch portion 32) in the configuration in FIG. 12, in any voltage applied state, the center of liquid crystal alignment (dark line) in the electrode gap is stabilized, and the generation of an afterimage can be suppressed. The generation of an area where an electric field is not applied can be suppressed in the electrode gap in areas near the ends of the branch portion 22 and the branch portion 32, and as a result, loss of transmittance can be suppressed.

The branch portion 22 and the branch portion 32 each have two kinds of widths, and the width of the center area, other than the end/root area, is smaller than that of the end/root area. In other words, the electrode spacing S in the center area, other than the end (root) of each of the branch portion 22 and branch portion 32, is greater than that of the electrode spacing S of the end (root) of each of the branch portion 22 and the branch portion 32. Since a large electrode gap can be secured in the center portions of the branch portion 22 and branch portion 32, which has no influence on the generation of an afterimage, the pixel aperture ratio can be increased, and transmittance can be increased. The widths of the end/root and the center portion of the branch portion 22 are different. In the same manner, the widths of the end/root and the center portion of the branch portion 32 are different. Therefore L/S can be set to maximize transmittance in the center area, while L/S can be set to be effective for suppressing an afterimage in the end/root.

The distance between the pixel electrode 20 and the common electrode 30 changes toward the end of the branch portion 22 and the end of the branch portion 32, while axisymmetric contours of the electrodes with respect to the center line of the electrode gap are maintained. Therefore just like the configuration shown in FIG. 6 and FIG. 12, the distance between the equipotential lines can be increased smoothly and evenly from the end (root) to the center portion of the branch portion 22 and branch portion 32. Therefore the equipotential lines are uniformly spaced apart from each other even in an area where the electrode spacing S changes, and liquid crystal molecules can always be tilted symmetrically with respect to the dark line, even in an area where the electrode spacing S changes. In other words, a dark line can always be generated in one position in the electrode gap so that the position of the dark line does not change, even in the area where the electrode spacing S changes. As a result, the center of the liquid crystal alignment can be stabilized in the area where the electrode spacing S changes, and the generation of an afterimage in the area where the electrode spacing S changes can be suppressed.

In this configuration as well, one sub-pixel has four domains, so viewing angle characteristics in the horizontal and vertical directions can be symmetric.

Figure 15:
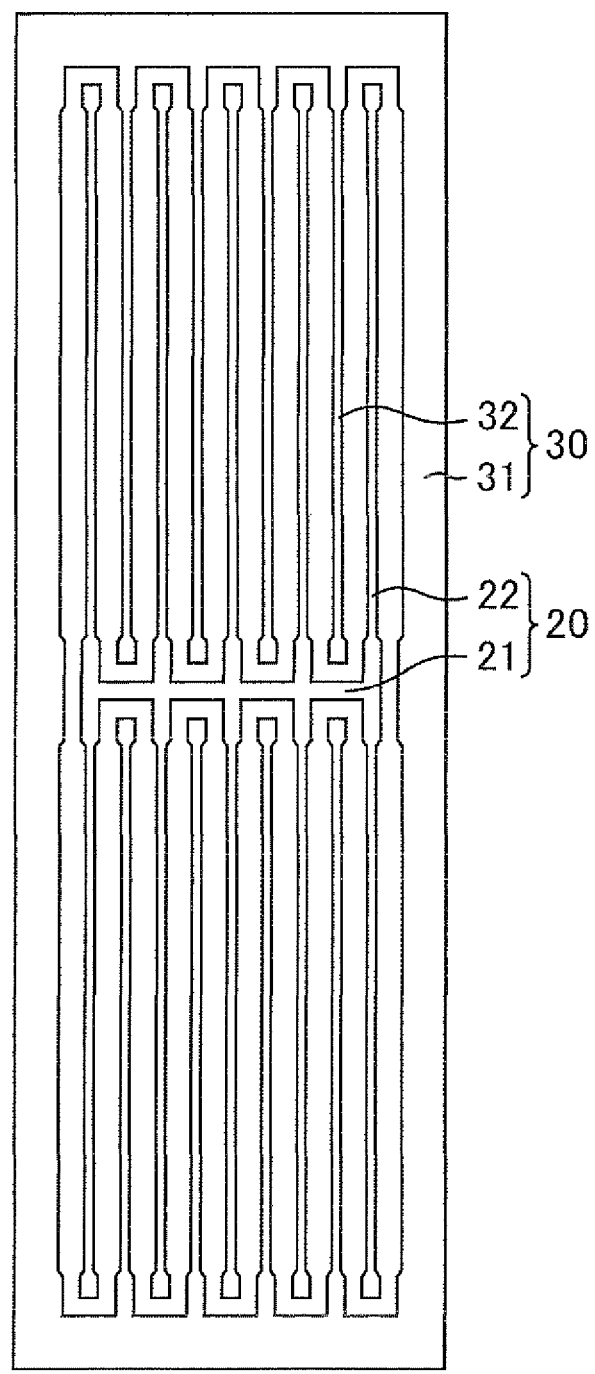
FIG. 15 is a plan view schematically depicting another configuration of the liquid crystal display device of Embodiment 1.

FIG. 15 is a plan view schematically depicting another configuration of the liquid crystal display device of Embodiment 1.

In the configuration shown in FIG. 14, the pixel electrode 20 may have a linear trunk portion 21 in plan view disposed in the horizontal direction, and a linear branch portion 22 in plan view connected to the trunk portion 21 and disposed in a 90° or 270° direction, so as to equally part the sub-pixel area vertically into two, as shown in FIG. 15.

At this time, the common electrode 30 may have a lattice-shaped trunk portion 31 planarly disposed vertically and horizontally so as to be superimposed on the gate bus line and source bus line, and a linear branch portion 32 in plan view connected to the trunk portion 31 and disposed in a 270° or 90°.

In this way, the sub-pixel in the configuration shown in FIG. 15 may have two domains. Thereby the generation of an afterimage can be suppressed. The liquid crystal display device shown in FIG. 15 has the highest sub-pixel area utilization efficiency, so transmittance can be increased.

Figure 16:
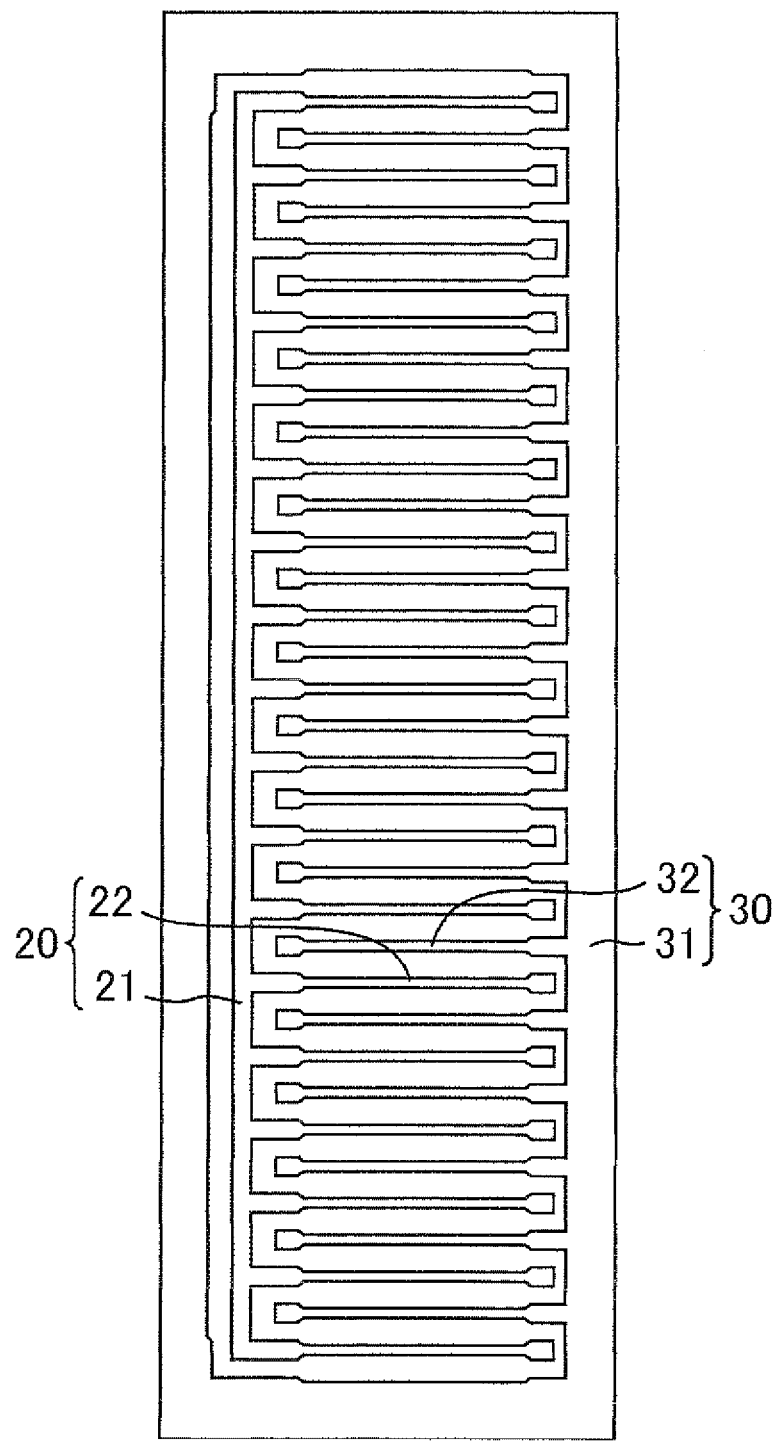
FIG. 16 is a plan view schematically depicting another configuration of the liquid crystal display device of Embodiment 1.

FIG. 16 is a plan view schematically depicting another configuration of the liquid crystal display device of Embodiment 1.

In the configuration shown in FIG. 14, the pixel electrode 20 may have a linear trunk portion 21 in plan view disposed in the vertical direction along the boundary of the sub-pixel, and a linear branch portion 22 in plan view connected to the trunk portion 21 and disposed in a 0° direction, as shown in FIG. 16.

At this time, the common electrode 30 may have a lattice-shaped trunk portion 31 planarly disposed vertically and horizontally so as to be superimposed on the gate bus line and source bus line, and a linear branch portion 32 in plan view connected to the trunk portion 31 and disposed in a 180° direction.

In this way, the sub-pixel in the configuration shown in FIG. 16 may have two domains. Thereby the generation of an afterimage can be suppressed. In the case of the liquid crystal display device shown in FIG. 16, compared with the later mentioned configuration shown in FIG. 17, the number of ends of the branch portions 22 and branch portion 32 can be decreased. In other words, the number of liquid crystal molecules which are tilted in a parallel or perpendicular direction with respect to the absorption axis can be decreased, so this configuration can easily increase transmittance. Therefore the liquid crystal display device shown in FIG. 16 is suitable for a liquid crystal display device having small sub-pixel, with which an increase in transmittance is difficult.

Figure 17:
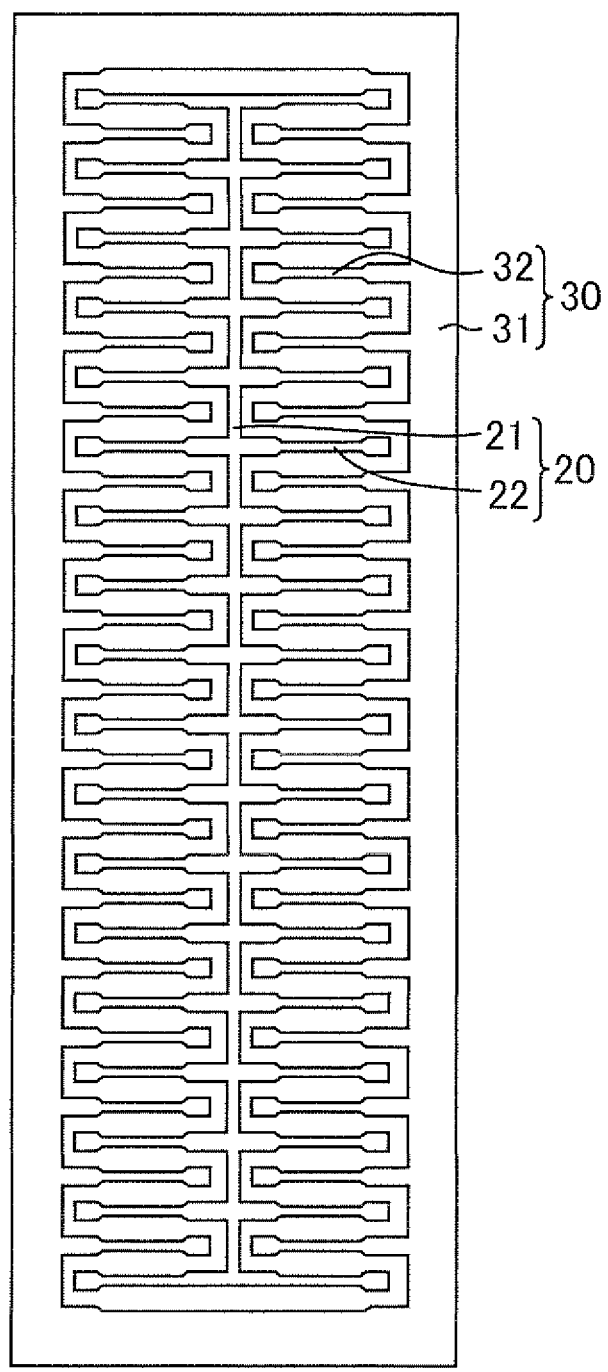
FIG. 17 is a plan view schematically depicting another configuration of the liquid crystal display device of Embodiment 1.

FIG. 17 is a plan view schematically depicting another configuration of the liquid crystal display device of Embodiment 1.

In the configuration shown in FIG. 14, the pixel electrode 20 may have a linear trunk portion 21 in plan view disposed in the vertical direction so as to equally part the sub-pixel area horizontally into two, and a linear branch portion 22 in plan view connected to the trunk portion 21 and disposed in a 0° or 180° direction, as shown in FIG. 17.

At this time, the common electrode 30 may have a lattice-shaped trunk portion 31 planarly disposed vertically and horizontally so as to be superimposed on the gate bus line and source bus line, and a linear branch portion 32 in plan view connected to the trunk portion 31 and disposed in a 180° or 0° direction.

In this way, the sub-pixel in the configuration shown in FIG. 17 may have two domains. Thereby the generation of an afterimage can be suppressed. The liquid crystal display device shown in FIG. 17 tends to have the higher number of ends of the branch portions 22 and branch portions 32 compared with the configuration shown in FIG. 16. In other words, the number of liquid crystal molecules which are tilted in the parallel or perpendicular direction with respect to the absorption axis tend to increase, so it is difficult to increase transmittance in this configuration. Therefore the liquid crystal display device shown in FIG. 17 is suitable for a liquid crystal display having large sub-pixels, with which transmittance can be easily increased.

Figure 18:
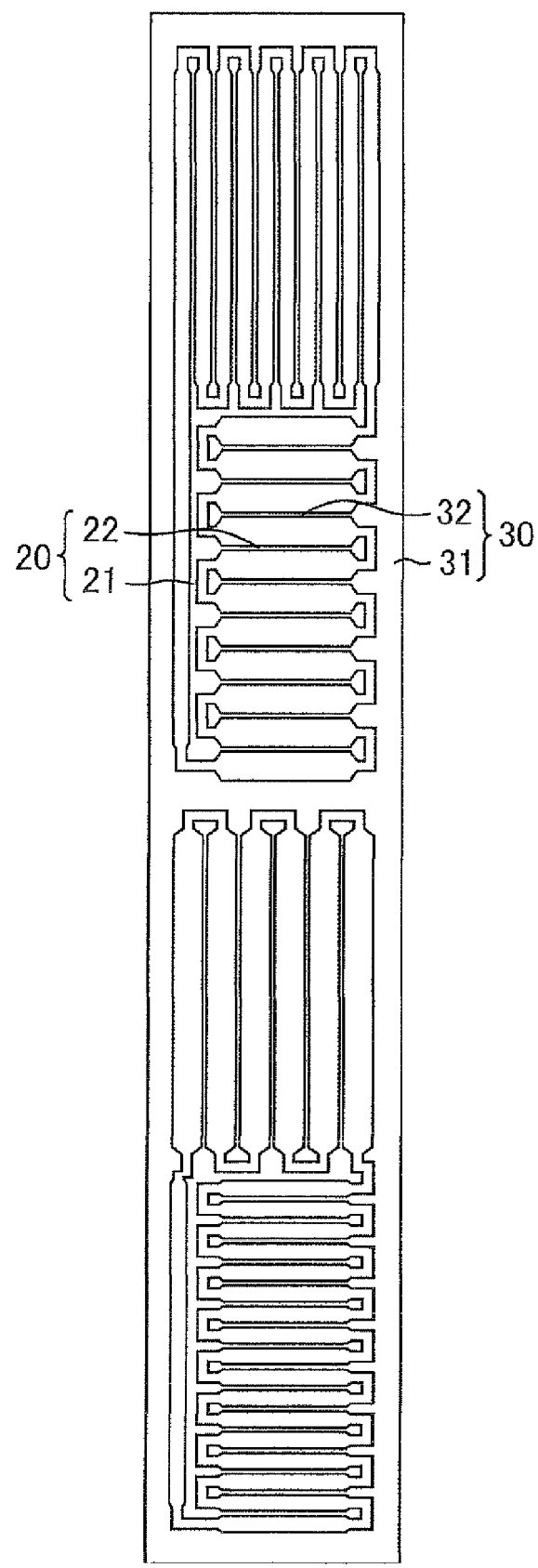
FIG. 18 is a plan view schematically depicting another configuration of the liquid crystal display device of Embodiment 1.

FIG. 18 is a plan view schematically depicting another configuration of the liquid crystal display device of Embodiment 1.

In the configuration shown in FIG. 14, the distance between the center portion of the branch portion 22 of the pixel electrode 20 and the center portion of the branch portion 32 of the common electrode 30, which are disposed in a 90° (vertical) direction, and the distance between the center portion of the branch portion 22 of the pixel electrode 20 and the center portion of the branch portion 32 of the common electrode 30, which are disposed in a 0° (horizontal) direction, may be different, as shown in FIG. 18. By disposing a plurality of L/Ss within one sub-pixel like this, a plurality of V (voltage)–T (transmittance) characteristics exist in one sub-pixel. As a result, a white float phenomena, which is generated when the viewing angle is tilted in a diagonal direction from the front face direction, can be suppressed.

In one of the adjacent two sub-pixels, the distance between the center portion of the branch portion 22 and the center portion of the branch portion 32, which are disposed in a 90° direction, is smaller than the distance between the center portion of the branch portion 22 and the center portion of the branch portion 32, which are disposed in a 0° direction. In the other one of the two adjacent sub-pixels, on the other hand, the distance between the center portion of the branch portion 22 and the center portion of the branch portion 32, which are disposed in a 90° direction, is larger than the distance between the center portion of the branch portion 22 and the center portion of the branch portion 32, which are disposed in a 0° direction. Thereby four domains having two kinds of electrode spacings (wide and narrow) can be formed in two sub-pixels. Hence a white float phenomena, which is generated when the viewing angle is tilted in a diagonal direction from the front face direction, can be suppressed, and the viewing angle characteristics can be symmetric vertically and horizontally.

Since this configuration has four domains in two sub-pixels, the viewing angle characteristics can be symmetric vertically and horizontally while suppressing the white floating phenomena.

FIGS. 19(*a*) to 19(*d*) are plan views schematically depicting variant forms of the liquid crystal display device of Embodiment 1. The plane shape of corners (angles) of the pixel electrode 20 and common electrode 30 of the present embodiment may be rounded in an arc shape, as shown in FIGS. 19(*a*) to 19(*d*). Thereby the electrode spacing S can be uniform with more accuracy in areas surrounding the end of the branch portion 22 and the end of the branch portion 32, respectively. Hence the generation of an afterimage can be suppressed more effectively. The patterns of the pixel electrode 20 and common electrode 30 are normally formed by a photolithography method, but the corners tend to be rounded if the sub-pixel size is small or if the resolution of the exposure device is low. Therefore this configuration is suitable when the sub-pixel size is small or when the resolution of the exposure device is low. The curvature of the rounded corner is not especially restricted, and can be appropriately set according to a desired sub-pixel layout. The plane shape of the corners (angles) of the pixel electrode 20 and common electrode 30 may be rounded in an elliptical arc.

Comparative Embodiment 1

Figure 20:
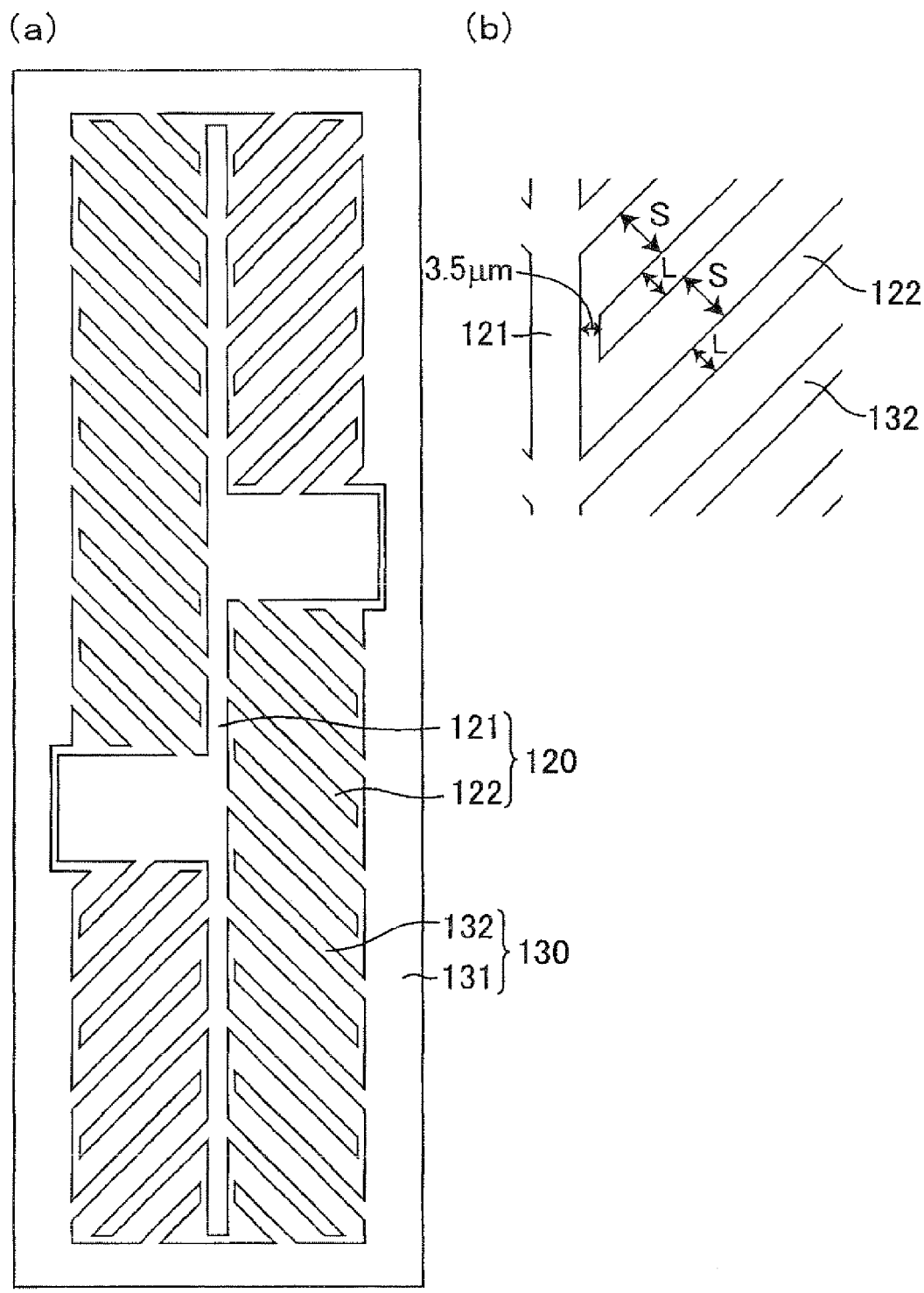
FIG. 20 are plan views schematically depicting a configuration of a liquid crystal display device of Comparative Embodiment 1, where FIG. 20(*a*) shows one sub-pixel, and FIG. 20(*b*) is an enlarged view of FIG. 20(*a*).
Figure 21:
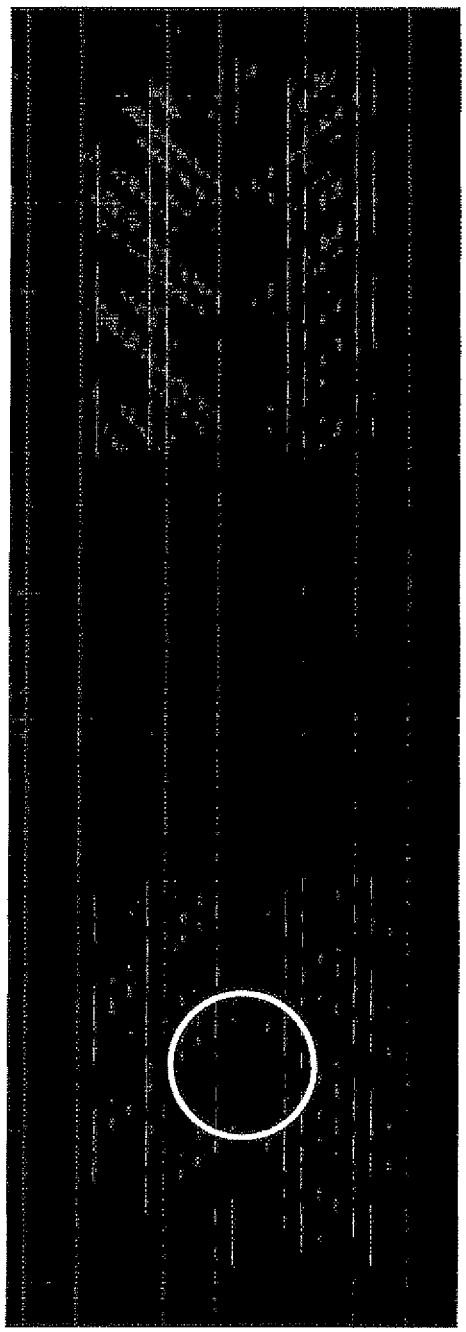
FIG. 21 shows an optical microphotograph of a sub-pixel of the liquid crystal display device of Comparative Embodiment 1.

FIG. 20 is a plan view schematically depicting a configuration of a liquid crystal display device of Comparative Embodiment 1, where FIG. 20(a) shows one sub-pixel and FIG. 20(b) is an enlarged view of FIG. 20(a). FIG. 21 shows an optical microphotograph of the sub-pixel of the liquid crystal display device of Comparative Embodiment 1. FIG. 21 is a photograph when L/S is set to 2.5 µm/7.5 µm and a maximum grayscale (255 grayscales) is applied. FIG. 22 shows the liquid crystal display device of Comparative Embodiment 1, where FIG. 22(a) shows an optical microphotograph of the area near the trunk portion of the pixel electrode, and FIG. 22(b) is a plan view schematically depicting the area near the trunk portion of the pixel electrode. FIG. 22 is a photograph when L/S is set to 4.0 µm/4.0 µm, and a maximum grayscale (255 grayscales) is applied.

As FIG. 20 shows, the liquid crystal display device of the comparative embodiment has a comb type pixel electrode 120 having the trunk portion 121 and branch portion 122, and a comb type common electrode 130 having the trunk portion 131 and branch portion 132. The electrode gap in the area surrounding the branch portion 122 or branch portion 132 is not chamfered, and the electrode spacing in this area is non-uniform. The distance between the branch portion 122 of the pixel electrode 120 and the trunk portion 131 of the common electrode 130, and the distance between the trunk portion 121 of the pixel electrode 120 and the branch portion 132 of the common electrode 130 are both set to 3.5 µm.

As a result, as FIGS. 21 and 22 show, light does not transmit areas near the trunk portions 121 and 132, and the transmittance loss of the liquid crystal display device of the comparative embodiment is high. The reason is probably because the alignment control force by the electrodes in these areas is weak.

Figure 23:
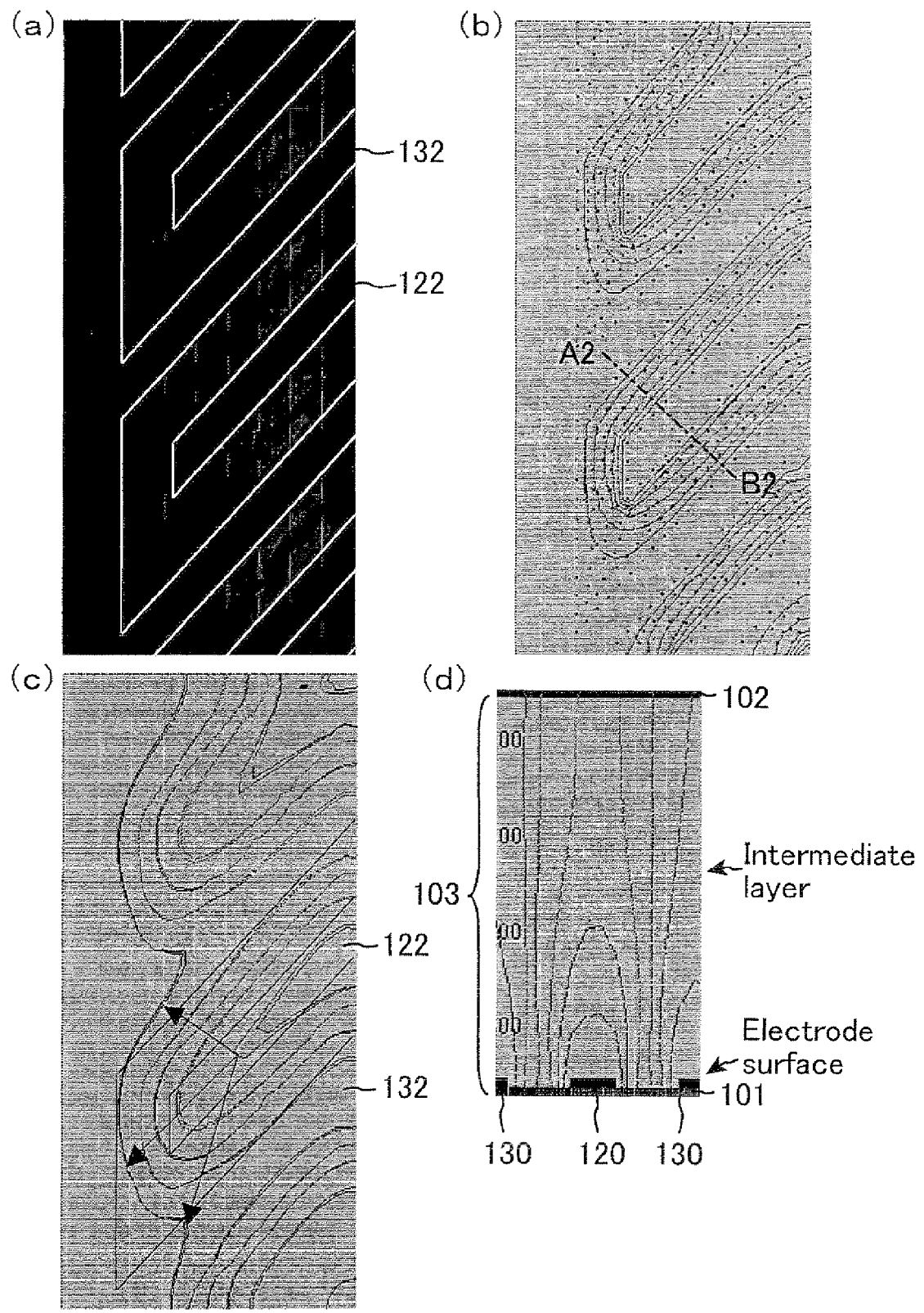
FIG. 23 shows the simulation result of the liquid crystal display device of Comparative Embodiment 1, where FIG. 23(*a*) shows a result of the optical simulation (alignment simulation), FIG. 23(*b*) shows equipotential lines on the intermediate layer of the liquid crystal layer, FIG. 23(*c*) shows equipotential lines on the intermediate layer of the liquid crystal layer, and FIG. 23(*d*) shows a cross-section at the A2-B2 line in FIG. 23(*b*).

FIG. 23 shows the simulation result of the liquid crystal display device of Comparative Embodiment 1, where FIG. 23(a) shows the result of optical simulation (alignment simulation), FIG. 23(b) shows equipotential lines on the electrode surface, FIG. 23(c) shows equipotential lines on the intermediate layer of the liquid crystal layer, and FIG. 23(d) shows a cross-section at the A2-B2 line in FIG. 23(b). This simulation was performed under the simulation conditions of Embodiment 1. L/S is set to L/S=2.5 µm/3.5 µm. FIG. 23 shows the result when the potential of the pixel electrode 120 is set to 6.5 V.

As a result, in the liquid crystal display device of the present comparative embodiment, as FIG. 23(d) shows, a wraparound of the equipotential lines onto the pixel electrode 20 and the common electrode 30 is generated since the line width, L is small and the electrode spacing S is narrow. The equipotential lines are not uniformly spaced apart from each other in each depth of the liquid crystal layer 103 from the lower-substrate (active matrix substrate 101) side to the upper-substrate (counter substrate 102) side, and as FIG. 23(c) shows, the equipotential lines are unevenly spaced apart from each other particularly in the intermediate layer of the liquid crystal layer 103. Since the equipotential lines are not uniformly spaced apart from each other in the areas near the ends of the branch portion 122 and the branch portion 132, the liquid crystal molecules do not tilt symmetrically with respect to the dark line (area where liquid crystal molecules always align perpendicularly, regardless of the applied voltage value) in the areas near the ends of the branch portion 122 and the branch portion 132. Therefore the center of the liquid crystal alignment is not settled in the electrode gap in the areas surrounding the ends of the branch portion 122 and branch portion 132, respectively. In other words, as FIG. 23(a) shows, the dark line is not always generated in one position in the electrode gap in the areas near the ends of the branch portion 122 and branch portion 132, and the position of the dark line changes. Hence the area ratio of the two domains, which are adjacent to the dark line and have mutually different optical characteristics, also changes, and as a result, an afterimage is easily generated.

Figure 24:
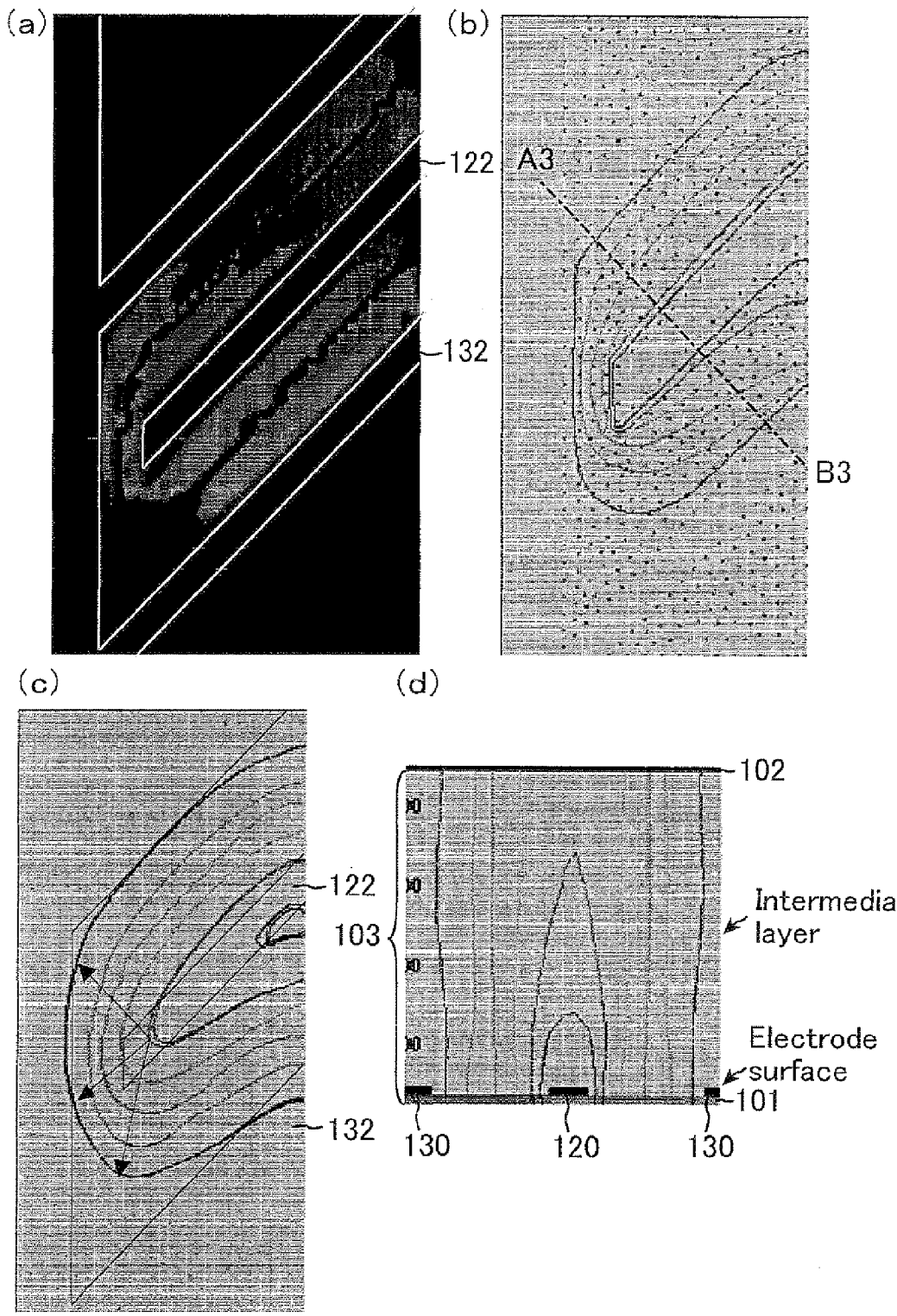
FIG. 24 shows the simulation result of another configuration of the liquid crystal display device of Comparative Embodiment 1, where FIG. 24(*a*) shows a result of the optical simulation (alignment simulation), FIG. 24(*b*) shows equipotential lines on the electrode surface, FIG. 24(*c*) shows equipotential lines on the intermediate layer of the liquid crystal layer, and FIG. 24(*d*) shows a cross-section at the A3-B3 line in FIG. 24(*b*).

FIG. 24 shows the simulation result of another configuration of the liquid crystal display device of Comparative Embodiment 1, where FIG. 24(a) shows the result of optical simulation (alignment simulation), FIG. 24(b) shows equipotential lines on the electrode surface, FIG. 24(c) shows equipotential lines on the intermediate layer of the liquid crystal layer, and FIG. 24(d) shows a cross-section at the A3-B3 line in FIG. 24(b). This simulation is performed under the simulation conditions of Embodiment 1. L/S is set to L/S=2.5 µm/7.5 µm. FIG. 24 shows the result when the potential of the pixel electrode 120 is set to 6.5 V.

As a result, in the liquid crystal display device of the present comparative embodiment, as FIG. 24(d) shows, a wraparound of the equipotential lines onto the pixel electrode 20 and the common electrode 30 is not generated, since the electrode spacing S is wide, although the line width L is narrow. However the equipotential lines are not uniformly spaced apart from each other in each depth of the liquid crystal layer 103, from the lower-substrate (active matrix substrate 101) side to the upper-substrate (counter substrate 102) side, and as FIG. 24(c) shows, the equipotential lines are not uniformly spaced apart from each other particularly in the intermediate layer of the liquid crystal layer 103. Therefore just like the case of FIG. 23, an afterimage is easily generated.

Embodiment 2

Figure 25:
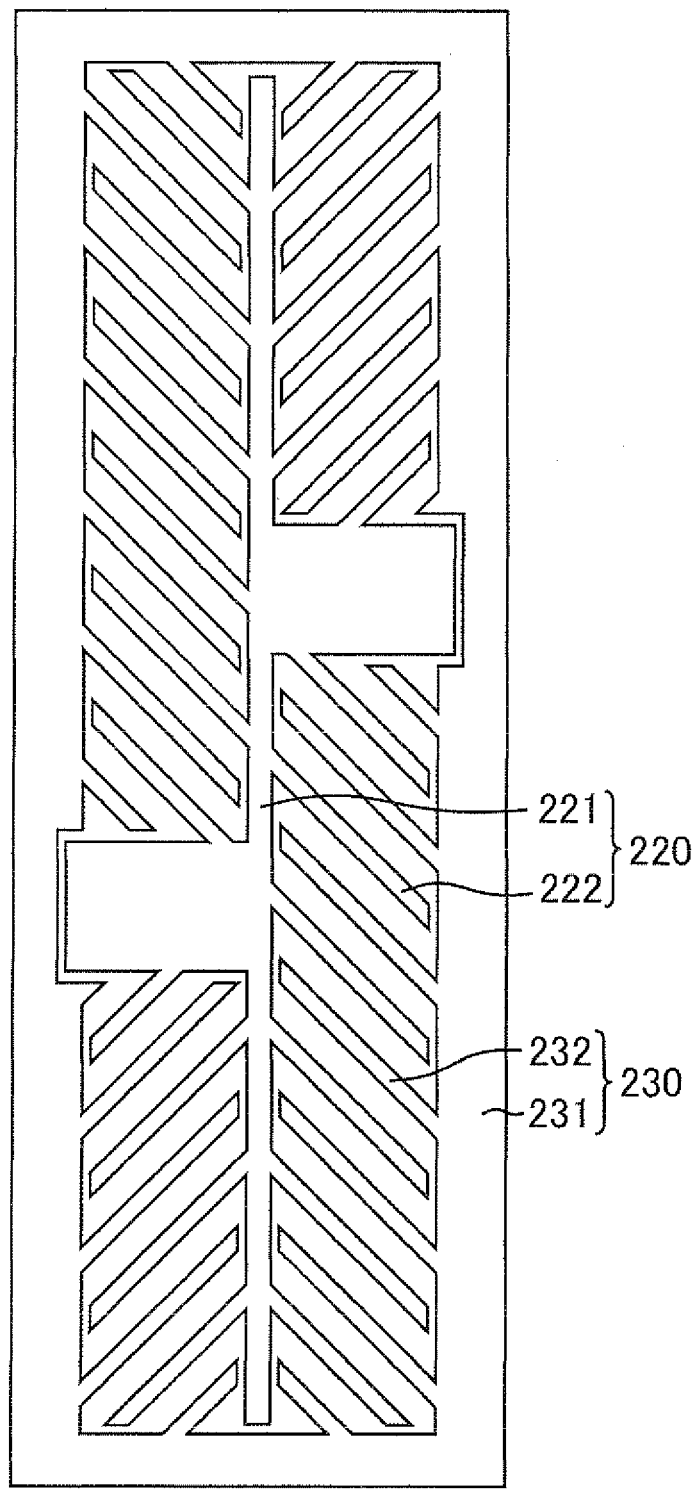
FIG. 25 is a schematic plan view of a configuration of the liquid crystal display device of Embodiment 2.

FIG. 25 is a plan view schematically depicting a configuration of a liquid crystal display device of Embodiment 2.

The liquid crystal display device of the present embodiment has the same configuration as the liquid crystal display device of Embodiment 1, except that the layout of the pixel electrode and common electrode is different, so only the differences from Embodiment 1 will be described in detail.

As FIG. 25 shows, the liquid crystal display device of the embodiment has a comb type pixel electrode 220 having the trunk portion 221 and branch portion 222, and a comb type common electrode 230 having the trunk portion 231 and branch portion 232. The electrode gap is not chamfered in the areas surrounding the branch portion 222 or branch portion 232, respectively, and the electrode spacing in this area is nonuniform.

FIG. 26 shows the simulation result of the liquid crystal display device of Embodiment 2, where FIG. 26(a) shows the result of optical simulation (alignment simulation), FIG. 26(b) shows equipotential lines on the electrode surface, and FIG. 26(c) shows equipotential lines on the intermediate layer of the liquid crystal layer. This simulation is performed under the simulation conditions of Embodiment 1. L/S is set to L/S=4.0 μm/4.0 μm. The distance between the branch portion 222 of the pixel electrode 220 and the trunk portion 231 of the common electrode 230, and the distance between the trunk portion 221 of the pixel electrode 220 and the branch portion 232 of the common electrode 230, are also set to 4.0 μm. FIG. 26 shows the result when the potential of the pixel electrode 220 is set to 6.5 V.

As a result, in the liquid crystal display device of the present embodiment, the equipotential lines are substantially uniformly spaced apart from each other in each depth of the liquid crystal layer from the lower-substrate (active matrix substrate) side to the upper-substrate (counter substrate) side. In other words, as FIG. 26(c) shows, the equipotential lines are substantially equally spaced apart from each other in the intermediate layer of the liquid crystal layer. Therefore the liquid crystal molecules always tilt symmetrically with respect to the dark line (area where liquid crystal molecules always align perpendicularly regardless of the applied voltage value) in the areas near the ends of the branch portion 222 and branch portion 232. Therefore the center of the liquid crystal alignment is stable in the electrode gap in the areas surrounding the ends of the branch portion 222 and branch portion 232, respectively. In other words, as FIG. 26(a) shows, the dark line is always generated in one position in the electrode gap in the area near the ends of the branch portion 222 and branch portion 232, and the position of the dark line does not change. Hence the area ratio of the two domains, which are adjacent to the dark line and have mutually different optical characteristics, does not change either, and as a result, an afterimage is not easily generated.

However as the area enclosed by the circle in FIG. 26(c) an area where the electric field is not applied in the electrode gap is generated near the ends of the branch portion 222 and branch portion 232, and as a result, transmittance loss is generated.

Embodiment 3

A liquid crystal display device of Embodiment 3 has the same configuration as the liquid crystal display device of Embodiment 2, except that L/S is set to L/S=4.0 μm/12.0 μm.

Comparative Embodiment 2

A liquid crystal display device of Comparative Embodiment 2 has the same configuration as the liquid crystal display device of Embodiment 2, except that L/S is set to L/S=2.5 μm/7.5 μm.

Comparative Embodiment 3

A liquid crystal display device of Comparative Embodiment 3 has the same configuration as the liquid crystal display device of Embodiment 2, except that L/S is set to L/S=2.5 μm/5.0 μm.

Comparative Embodiment 4

A liquid crystal display device of Comparative Embodiment 4 has the same configuration as the liquid crystal display device of Embodiment 2, except that L/S is set to L/S=2.5 μm/4.0 μm.

Comparative Embodiment 5

A liquid crystal display device of Comparative Embodiment 5 has the same configuration as the liquid crystal display device of Embodiment 2, except that L/S is set to L/S=2.5 μm/3.5 μm.

Panels were fabricated in accordance with Embodiments 2 and 3, and Comparative Embodiments 2 to 5, and an afterimage was evaluated by the same method as the evaluation method described with reference to FIG. 31, and Table 4 shows the result. For the evaluation of an afterimage, a liquid crystal display device, which was fabricated in the same way as the liquid crystal display device shown in FIG. 4, except that the pixel layout is changed, was used. As a result, an afterimage was not generated in Embodiments 2 and 3, but an afterimage was generated in Comparative Embodiments 2 to 5.

TABLE 4

| Pixel pattern | L/S size (μm) | | | | | |
|---|---|---|---|---|---|---|
| | Comparative Embodiment 5 2.5/3.5 | Comparative Embodiment 4 2.5/4.0 | Comparative Embodiment 3 2.5/5.0 | Comparative Embodiment 2 2.5/7.5 | Embodiment 2 4.0/4.0 | Embodiment 3 4.0/12.0 |
| Afterimage | X (generated) | X (generated) | X (generated) | X (generated) | ○ (None) | ○ (None) |

Figure 29:
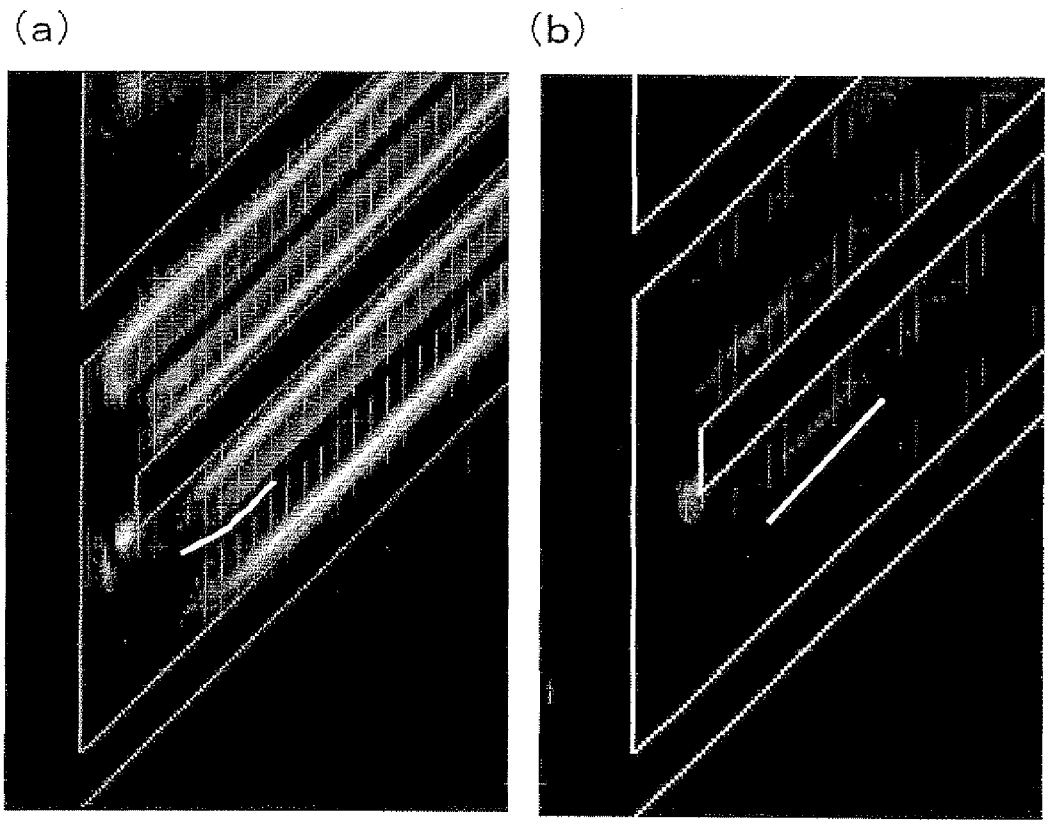
FIG. 29 shows the result of optical simulation (alignment simulation) of the liquid crystal display device of Comparative Embodiment 2, where FIG. 29(*a*) shows the result when the potential of the pixel electrode is 6 V, and FIG. 29(*b*) shows the result when the potential of the pixel electrode is 3 V.
Figure 30:
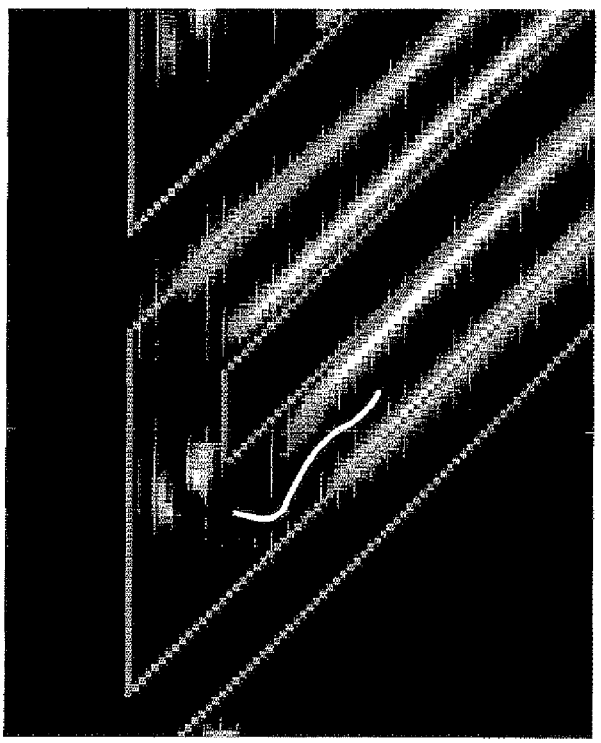
FIG. 30 shows the result of optical simulation (alignment simulation) of the liquid crystal display device of Comparative Embodiment 5, and shows the result when the potential of the pixel electrode is 6 V.

FIG. 27 shows the optical simulation (alignment simulation) result of the liquid crystal display device of Embodiment 2, where FIG. 27(a) shows the result when the potential of the pixel electrode is 6 V, and FIG. 27(b) shows the result when the potential of the pixel electrode is 3 V. FIG. 28 shows the optical simulation (alignment simulation) result of the liquid crystal display device of Embodiment 3, and is a result when the potential of the pixel electrode is 6V. FIG. 29 shows the optical simulation (alignment simulation) result of the liquid crystal display device of Comparative Embodiment 2, where FIG. 29(a) shows the result when the potential of the pixel electrode is 6V, and FIG. 29(b) shows the result when the potential of the pixel electrode is 3 V. FIG. 30 shows the optical simulation (alignment simulation) result of the liquid crystal display device of Comparative Embodiment 5, and is a result when the potential of the pixel electrode is 6 V. Simulation was performed in the same manner for the liquid crystal display devices of Comparative Embodiments 3 and 4. These simulations were performed under the simulation conditions of Embodiment 1. Table 5 shows a summary of the optical simulation results of Embodiments 2 and 3, and Comparative Embodiments 2 to 5.

TABLE 5

| Pixel pattern | L/S size (μm) | | | | | |
|---|---|---|---|---|---|---|
| | Comparative Embodiment 5 2.5/3.5 | Comparative Embodiment 4 2.5/4.0 | Comparative Embodiment 3 2.5/5.0 | Comparative Embodiment 2 2.5/7.5 | Embodiment 2 4.0/4.0 | Embodiment 3 4.0/12.0 |
| Applied voltage 6 V | Nonuniform | | | | Uniform | |
| 3 V | | Uniform | | | | |
| 0 V | Uniform (all liquid crystal molecules are perpendicularly aligned) | | | | | |

As a result, in the liquid crystal display devices of Embodiments 2 and 3, the dark line (area where liquid crystal molecules always align perpendicularly regardless of the applied voltage value) is uniform when 6 V and 3 V are applied, as shown in Table 5 and FIGS. 27 and 28 (see the white line therein). In other words, when 6 V and 3 V are applied, the dark line is always at a predetermined position of the electrode gap. This is probably the reason why an afterimage was not generated in the liquid crystal display devices of Embodiments 2 and 3.

In the liquid crystal display devices of Comparative Embodiments 2 to 5, on the other hand, the dark line is uniform when 3 V is applied as shown in Table 5 and FIG. 29(b) (see the white line therein). In other words, when 3 V is applied, the dark line is always at a predetermined position of the electrode gap. However, as Table 5, FIG. 29(a) and FIG. 30 (see the white line therein) show, the dark line is nonuniform when 6 V is applied. In other words, when 6 V is applied, the dark line is not at a predetermined position of the electrode gap. Therefore in the liquid crystal display devices of Comparative Embodiments 2 to 5, the dark line moved in the sub-pixel which changed from a white grayscale (maximum grayscale) to a half-tone, and an afterimage is visually recognized while this dark line is moving.

The present application claims priority to Patent Application No. 2008-265562 filed in Japan on Oct. 14, 2008 under the Paris Convention and provisions of national law in a designated State. The entire contents of which are hereby incorporated by reference.

| EXPLANATION OF SYMBOLS | |
|---|---|
| 1 | active matrix substrate (TFT array substrate) |
| 2 | counter substrate |
| 3 | liquid crystal layer |
| 20 | pixel electrode |
| 21 | trunk portion |
| 22 | branch portion |
| 30 | common electrode |
| 31 | trunk portion |
| 32 | branch portion |

The invention claimed is:

1. A liquid crystal display device, comprising:
a first substrate and a second substrate which are disposed to face each other; and
a liquid crystal layer sandwiched between the first substrate and the second substrate,
wherein the first substrate has a comb type first electrode including a first branch portion and a comb type second electrode including a second branch portion,
the first electrode and the second electrode are planarly disposed to face each other in a pixel,
the liquid crystal layer includes p-type nematic liquid crystals and is driven by an electric field generated between the first electrode and the second electrode,
the p-type nematic liquid crystals are aligned perpendicularly to the first substrate and second substrate surfaces when no voltage is applied,
the first branch portion and the second branch portion extend diagonally with respect to a boundary line between adjacent pixels, and
a distance between the first electrode and the second electrode is substantially uniform in an area surrounding an end of the first branch portion.

2. The liquid crystal display device according to claim 1, wherein the distance between the first electrode and the second electrode is substantially uniform in an area surrounding an end of the second branch portion.

3. The liquid crystal display device according to claim 1, wherein the first electrode or the second electrode has a zigzag-shaped trunk portion.

4. The liquid crystal display device according to claim 1, wherein a width of the end of the first branch portion and a width of a center portion of the first branch portion are different, and
a width of the second electrode in the area surrounding the end of the first branch portion is different from a width of a center portion of the second branch portion.

5. The liquid crystal display device according to claim 4, wherein a width of an end of the second branch portion and the width of the center portion of the second branch portion are different, and
a width of the first electrode in an area surrounding the end of the second branch portion is different from the width of the center portion of the first branch portion.

6. The liquid crystal display device according to claim 1, wherein the distance between the first electrode and the second electrode changes toward the end of the first branch portion while axisymmetric contours of the first electrode and the second electrode are maintained.

7. The liquid crystal display device according to claim 6, wherein the distance between the first electrode and the second electrode changes toward an end of the second branch portion while axisymmetric contours of the first electrode and the second electrode are maintained.

8. The liquid crystal display device according to claim 1, wherein at least one of the first electrode and the second electrode has rounded corners in plan view.

9. A liquid crystal display device, comprising:
a first substrate and a second substrate which are disposed to face each other; and
a liquid crystal layer sandwiched between the first substrate and the second substrate,
wherein the first substrate has a comb type first electrode including a first branch portion and a comb type second electrode including a second branch portion, the first electrode and the second electrode are planarly disposed to face each other in a pixel, the liquid crystal layer includes p-type nematic liquid crystals and is driven by an electric field generated between the first electrode and the second electrode, the p-type nematic liquid crystals are aligned perpendicularly to the first substrate and second substrate surfaces when no voltage is applied, a width of an end of the first branch portion and a width of a center portion of the first branch portion are different, a width of the second electrode in an area surrounding the end of the first branch portion is different from a width of a center portion of the second branch portion, and a distance between the first electrode and the second electrode changes toward the end of the first branch portion while axisymmetric contours of the first electrode and the second electrode are maintained.

10. The liquid crystal display device according to claim 9, wherein a width of an end of the second branch portion and the width of the center portion of the second branch portion are different, a width of the first electrode in an area surrounding the end of the second branch portion is different from the width of the center portion of the first branch portion, and the distance between the first electrode and the second electrode changes toward the end of the second branch portion while axisymmetric contours of the first electrode and the second electrode are maintained.

11. The liquid crystal display device according to claim 9, wherein the first branch portion and the second branch portion extend diagonally with respect to a boundary line between adjacent pixels, and the distance between the first electrode and the second electrode is substantially uniform in the area surrounding the end of the first branch portion.

12. The liquid crystal display device according to claim 11, wherein the distance between the first electrode and the second electrode is substantially uniform in an area surrounding an end of the second branch portion.

13. The liquid crystal display device according to claim 9, wherein the first electrode or the second electrode has a zigzag-shaped trunk portion.

14. The liquid crystal display device according to claim 9, wherein at least one of the first electrode and the second electrode has rounded corners in plan view.

15. A liquid crystal display device, comprising:
a first substrate and a second substrate which are disposed to face each other; and
a liquid crystal layer sandwiched between the first substrate and the second substrate, wherein the first substrate has a comb type first electrode including a first branch portion and a comb type second electrode including a second branch portion, the first electrode and the second electrode are planarly disposed to face each other in a pixel, the liquid crystal layer includes p-type nematic liquid crystals and is driven by an electric field generated between the first electrode and the second electrode, the p-type nematic liquid crystals are aligned perpendicularly to the first substrate and second substrate surfaces when no voltage is applied, the first branch portion and the second branch portion extend diagonally with respect to a boundary line between adjacent pixels, and the first electrode and the second electrode has a gap therebetween, the gap being chamfered in an area adjacent to an end of the first branch portion.

16. The liquid crystal display device according to claim 15, wherein the gap between the first electrode and the second electrode is chamfered in an area adjacent to an end of the second branch portion.

17. The liquid crystal display device according to claim 15, wherein the first electrode or the second electrode has a zigzag-shaped trunk portion.

18. The liquid crystal display device according to claim 15, wherein a width of the end of the first branch portion and a width of a center portion of the first branch portion are different, and a width of the second electrode in an area surrounding the end of the first branch portion is different from a width of a center portion of the second branch portion.

19. The liquid crystal display device according to claim 18, wherein a width of an end of the second branch portion and the width of the center portion of the second branch portion are different, and a width of the first electrode in an area surrounding the end of the second branch portion is different from the width of the center portion of the first branch portion.

20. The liquid crystal display device according to claim 15, wherein a distance between the first electrode and the second electrode changes toward the end of the first branch portion while axisymmetric contours of the first electrode and the second electrode are maintained.

21. The liquid crystal display device according to claim 20, wherein the distance between the first electrode and the second electrode changes toward an end of the second branch portion while axisymmetric contours of the first electrode and the second electrode are maintained.

22. The liquid crystal display device according to claim 15, wherein at least one of the first electrode and the second electrode has rounded corners in plan view.

* * * * *